(12) United States Patent
Sze et al.

(10) Patent No.: US 12,537,958 B2
(45) Date of Patent: Jan. 27, 2026

(54) VIDEO ENCODING AND DISTRIBUTION METHODS

(71) Applicant: Texas Instruments Incorporated, Dallas, TX (US)

(72) Inventors: Vivienne Sze, Cambridge, MA (US); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 19/328,418

(22) Filed: Sep. 15, 2025

(65) Prior Publication Data

US 2026/0012601 A1 Jan. 8, 2026

Related U.S. Application Data

(63) Continuation of application No. 18/395,503, filed on Dec. 23, 2023, which is a continuation of application
(Continued)

(51) Int. Cl.
| | |
|---|---|
| *H04N 19/13* | (2014.01) |
| *H04N 19/174* | (2014.01) |
| *H04N 19/176* | (2014.01) |
| *H04N 19/184* | (2014.01) |
| *H04N 19/60* | (2014.01) |

(Continued)

(52) U.S. Cl.
CPC ............ *H04N 19/13* (2014.11); *H04N 19/60* (2014.11); *H04N 19/70* (2014.11); *H04N 19/91* (2014.11); *H04N 19/174* (2014.11); *H04N 19/176* (2014.11); *H04N 19/184* (2014.11)

(58) Field of Classification Search
CPC ........ H04N 19/91; H04N 19/13; H04N 19/60; H04N 19/70
See application file for complete search history.

(56) References Cited

U.S. PATENT DOCUMENTS

| | | |
|---|---|---|
| 7,688,895 B2 | 3/2010 | Winger |
| 8,422,803 B2 | 4/2013 | Sekiguchi |
| (Continued) | | |

OTHER PUBLICATIONS

"Advanced Video Coding for Generic Audiovisual Services", Series H: Audiovisual and Multimedia Systems, ITU-T Recommendation H.264, Telecommunication Standardization Sector of International Communication Union, Mar. 2005 (343 pages).
(Continued)

*Primary Examiner* — Neil R Mikeska
(74) *Attorney, Agent, or Firm* — Carl G. Peterson; Frank D. Cimino

(57) ABSTRACT

A method for encoding a video sequence is provided that includes entropy encoding syntax elements representative of transform coefficients generated as the video sequence is processed, wherein entropy encoding syntax elements representative of a transform coefficient includes binarizing the syntax elements representative of the transform coefficient to generate a plurality of binary symbols (bins), coding a portion of the plurality of bins in context coding mode, and coding a remaining portion of the plurality of bins in bypass coding mode. The method further includes reducing the number of bins that are coded in context coding mode for each transform coefficient in a plurality of subsequent transform coefficients that are entropy encoded after a specified number of transform coefficients have been entropy encoded.

20 Claims, 13 Drawing Sheets

Related U.S. Application Data

No. 17/875,478, filed on Jul. 28, 2022, now Pat. No. 11,856,199, which is a continuation of application No. 16/189,728, filed on Nov. 13, 2018, now Pat. No. 11,425,384, which is a continuation of application No. 15/357,641, filed on Nov. 21, 2016, now Pat. No. 10,129,546, which is a continuation of application No. 13/737,809, filed on Jan. 9, 2013, now Pat. No. 9,503,717.

(60) Provisional application No. 61/584,457, filed on Jan. 9, 2012.

(51) Int. Cl.
*H04N 19/70* (2014.01)
*H04N 19/91* (2014.01)

(56) References Cited

U.S. PATENT DOCUMENTS

| | | | |
|---|---|---|---|
| 8,891,616 | B1 | 11/2014 | Wilkins |
| 8,989,265 | B2 | 3/2015 | Jeon |
| 2005/0012648 | A1 | 1/2005 | Marpe |
| 2005/0156762 | A1 | 7/2005 | Tsuru |
| 2005/0169374 | A1 | 8/2005 | Marpe |
| 2006/0028359 | A1 | 2/2006 | Kim |
| 2006/0126744 | A1 | 6/2006 | Peng |
| 2007/0183491 | A1 | 8/2007 | Pearson |
| 2009/0021403 | A1 | 1/2009 | Chan |
| 2009/0058695 | A1 | 3/2009 | Bao |
| 2010/0097250 | A1 | 4/2010 | Demircin |
| 2011/0001643 | A1 | 1/2011 | Sze |
| 2011/0150075 | A1 | 6/2011 | Pearson |
| 2012/0014454 | A1 | 1/2012 | Budagavi |
| 2012/0057637 | A1 | 3/2012 | Flachs |
| 2012/0140813 | A1 | 6/2012 | Sole Rojals |
| 2012/0183235 | A1 | 7/2012 | Sasai |
| 2012/0250763 | A1 | 10/2012 | Lainema |
| 2012/0300839 | A1 | 11/2012 | Sze |
| 2012/0328026 | A1 | 12/2012 | Sole Rojals |
| 2013/0027230 | A1 | 1/2013 | Marpe |
| 2013/0028334 | A1 | 1/2013 | Bossen |
| 2013/0114686 | A1 | 5/2013 | Misra |
| 2013/0177069 | A1 | 7/2013 | Sze |
| 2014/0023131 | A1 | 1/2014 | Sindalovsky |
| 2014/0023137 | A1 | 1/2014 | Goedeken |
| 2014/0140400 | A1 | 5/2014 | George |
| 2014/0198841 | A1 | 7/2014 | George |
| 2018/0007359 | A1 | 1/2018 | Hsiang |
| 2018/0205951 | A1 | 7/2018 | Hsiang |

OTHER PUBLICATIONS

"TMS320DM6467 Digital Media System-on-Chip", SPRS403G, Texas Instruments Incorporated, Dec. 2007, revised Oct. 2010, (355 pages).

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, Nov. 21-30, 2011, Geneva, Switzerland (259 pages).

Benjamin Bross et al, "High Efficiency Video Coding (HEVC) Text Specification Draft 7", JCTVC-I1003_d0, Joint Collaborative Team on Video Coding (JCT-VC) of ITU-T SG16 WP3 and ISO/IEC JTC1/SC29/WG11, Apr. 27-May 7, 2012, Geneva, Switzerland (270 pages).

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, Jul. 11-20, 2012, Stockholm, Sweden (260 pages).

Benjamin Bross et al, "High Efficiency Video Coding (HEVC) Text Specification Draft 9", JCTVC-K1003_v7, Joint Collaborative Team on Video Coding (JCT-VC) of ITU-T SG16 WP3 and ISO/IEC JTC1/SC29/WG11, Oct. 10-19, 2012, Shanghai, China (290 pages).

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, Jul. 14-22, 2011, Torino, Italy (229 pages).

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, Nov. 21-30, 2011, Geneva, Switzerland (237 pages).

Detlev Marpe et al, "Context-Based Adaptive Binary Arithmetic Coding in the H.264/AVC Video Compression Standard", IEEE Transactions on Circuits and Systems for Video Technology, pp. 620-636, vol. 13, No. 7, Jul. 2003 (17 pages).

Jani Lainema et al, "CABAC Bypass for Coefficient Data", JCTVC-H0233, Joint Collaborative Team on Video Coding (JCT-VC) of ITU-T SG16 WP3 and ISO/IEC JTC1/SC29/WG11, Feb. 1-10, 2012, San Jose, California (5 pages).

Jianle Chen et al, "Non-CE1: Throughput Improvement on CABAC Coefficients Level Coding", JCTVC-H0554 Presentation, Joint Collaborative Team on Video Coding (JCT-VC) of ITU-T SG16 WP3 and ISO/IEC JTC1/SC29/ WG11, Feb. 1-10, 2012, San Jose, California. (12 pages).

Jianle Chen et al, "Non-CE1: Throughput Improvement on CABAC Coefficients Level Coding", JCTVC-H0554, Joint Collaborative Team on Video Coding (JCT-VC) of ITU-T SG16 WP3 and ISO/IEC JTC1/SC29/WG11, Feb. 1-10, 2012, San Jose, California (14 pages).

Patent Prosecution History from U.S. Appl. No. 13/737,809, dated Jan. 9, 2013 to Nov. 2, 2016, 222 pages.

Thomas Wiegand et al., "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, Mar. 16-23, 2011, Geneva, Switzerland (215 pages).

VIDEO ENCODING AND DISTRIBUTION METHODS

CROSS-REFERENCE TO RELATED APPLICATIONS

This application is a continuation of U.S. application Ser. No. 18/395,503, filed Dec. 23, 2023, which is a continuation of U.S. application Ser. No. 17/875,478, filed Jul. 28, 2022 (now U.S. Pat. No. 11,856,199), which is a continuation of U.S. application Ser. No. 16/189,728, filed Nov. 13, 2018 (now U.S. Pat. No. 11,425,384), which is a continuation of U.S. application Ser. No. 15/357,641, filed Nov. 21, 2016 (now U.S. Pat. No. 10,129,546), which is a continuation of U.S. application Ser. No. 13/737,809, filed Jan. 9, 2013 (now U.S. Pat. No. 9,503,717), which claims the benefit of U.S. Provisional Application No. 61/584,457, filed Jan. 9, 2012, the contents of all of which are herein incorporated by reference in their entirety.

BACKGROUND

Field of the Invention

Embodiments of the present invention generally relate to context adaptive binary arithmetic coding (CABAC) in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

Context-adaptive binary arithmetic coding (CABAC) is a form of entropy coding used in video encoding. CABAC is an inherently lossless compression technique notable for providing considerably better compression than most other encoding algorithms used in video encoding at the cost of increased complexity. In brief, CABAC has multiple probability modes for different contexts. It first converts all non-binary symbols to binary symbols referred to as bins. Then, for each bin, the coder selects which probability model to use, and uses information from nearby elements to optimize the probability estimate. Arithmetic coding is then applied to compress the data. The theory and operation of CABAC coding for H.264/AVC is defined in the International Telecommunication Union, Telecommunication Standardization Sector (ITU-T) standard "Advanced video coding for generic audiovisual services" H.264, revision March 2005 or later, which is incorporated by reference herein. General principles are explained in "Context-Based Adaptive Binary Arithmetic Coding in the H.264/AVC Video Compression Standard," Detlev Marpe, July 2003, which is incorporated by reference herein.

CABAC is a well known throughput bottleneck in video codec implementations (particularly on the decoder side) due to the many feedback loops used. Further, the feedback loops make CABAC difficult to parallelize, which makes it difficult to achieve the high throughput necessary for high resolution and frame-rate videos. Furthermore, since high throughput can be traded-off for power savings using voltage scaling, the serial nature of CABAC limits the battery life for video codecs that reside on mobile devices. This limitation is a critical concern, as a significant portion of the future video codecs will be used on battery-operated devices.

SUMMARY

Embodiments of the present invention relate to methods and apparatus for context adaptive binary arithmetic coding (CABAC) with scalable throughput. In one aspect, a method for encoding a video sequence in a video encoder to generate a compressed video bit stream is provided that includes entropy encoding syntax elements representative of transform coefficients generated as the video sequence is processed in the video encoder, wherein entropy encoding syntax elements representative of a transform coefficient includes binarizing the syntax elements representative of the transform coefficient to generate a plurality of binary symbols (bins), coding a portion of the plurality of bins in context coding mode, and coding a remaining portion of the plurality of bins in bypass coding mode. The method further includes reducing a number of bins that are coded in context coding mode for each transform coefficient in a plurality of subsequent transform coefficients that are entropy encoded after a specified number of transform coefficients have been entropy encoded.

In one aspect, an apparatus including a video encoder is provided. The video encoder includes means for receiving a video sequence, means for generating a plurality of syntax elements corresponding to a slice of a picture of the video sequence as the slice is processed in the video encoder, and means for entropy encoding the plurality of syntax elements to generate a portion of a compressed bit stream, the means for entropy coding configured to operate in a normal mode and a high throughput mode, wherein in the normal mode, all context binary symbols (bins) corresponding to the syntax elements are context coded and all bypass bins corresponding to the syntax elements are bypass coded, and wherein in the high throughput mode, at least some of the context bins corresponding to the syntax elements are bypass coded, wherein the means for entropy coding is configured to enable high throughput mode for the slice after a specified number of coding elements are generated during entropy encoding of syntax elements in normal mode, wherein a coding element is one selected from a group consisting of a bin and a bit output into the compressed video bit stream.

In one aspect, a method for decoding a compressed video bit stream in a video decoder is provided that includes entropy decoding syntax elements representative of transform coefficients from the compressed video bit stream as the bit stream is processed in the video decoder, wherein entropy decoding syntax elements representative of a transform coefficient includes decoding a portion of a plurality of binary symbols (bins) corresponding to the syntax elements representative of the transform coefficient from bits in the bit stream in context coding mode, decoding a remaining portion of the plurality of bins from bits in the bit stream in bypass coding mode, and debinarizing the plurality of bins to recover the syntax elements representative of the transform coefficient. The method further includes reducing a number of bins that are decoded in context coding mode for each transform coefficient in a plurality of subsequent transform coefficients that are entropy decoded after a specified number of transform coefficients have been entropy decoded.

BRIEF DESCRIPTION OF THE DRAWINGS

Particular embodiments will now be described, by way of example only, and with reference to the accompanying drawings.

DETAILED DESCRIPTION

Figure 1A:
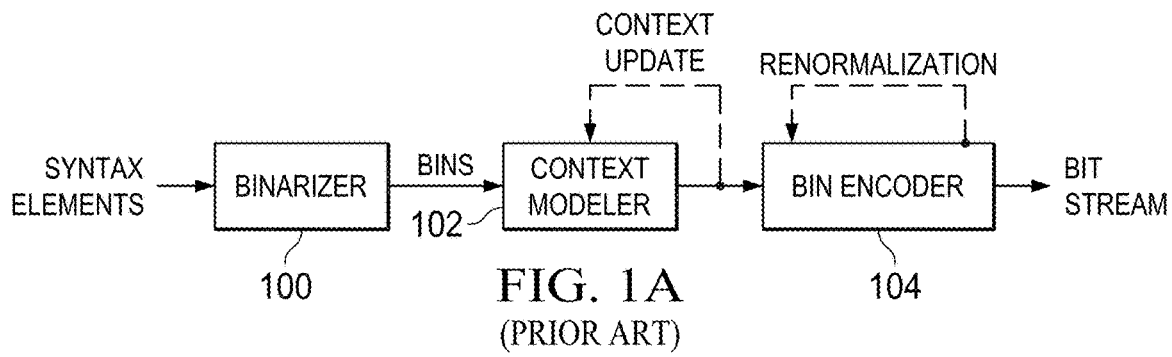
FIGS. 1A and 1B are block diagrams illustrating CABAC encoding and decoding.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. For convenience of description, some embodiments of the invention are described herein in reference to HEVC and use terminology from HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit. In recent specifications, the size of a square transform unit may be 4×4, 8×8, 16×16, and 32×32 and the size of a non-square transform may be 16×4, 4×16, 32×8, and 8×32. The sizes of the transform units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-11003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), and B. Bross, et al., "High Efficiency Video Coding (HEVC) Text Specification Draft 9," JCTVC-K1003_v7, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9"). Each of these documents describes CABAC coding.

Figure 1B:
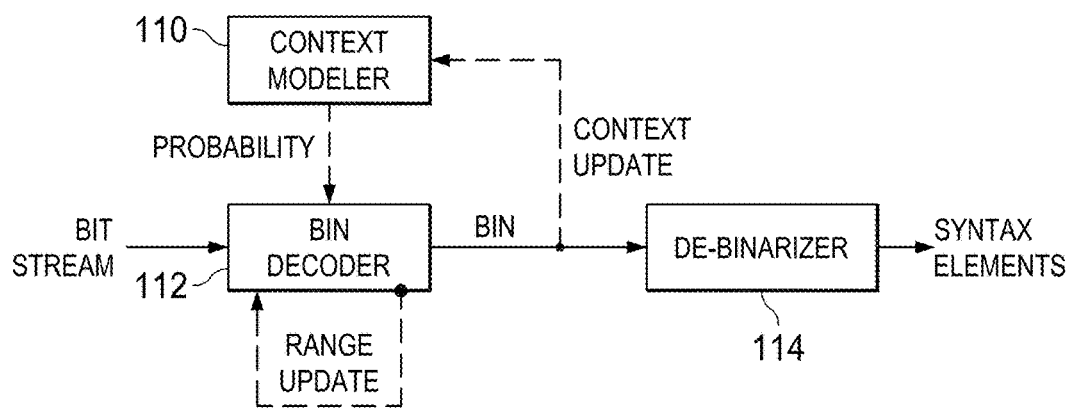

As was previously mentioned, context-adaptive binary arithmetic coding (CABAC) is a well known throughput bottleneck in the implementation of video codecs due to the feedback loops involved. FIGS. 1A and 1B are block diagrams illustrating the three key components of, respectively, CABAC encoding and CABAC decoding. The feedback loops are highlighted as dashed lines. Referring now to FIG. 1A, a CABAC encoder includes a binarizer 100, a context modeler 102, and a bin encoder 104. The binarizer 100 converts syntax elements into strings of one or more binary symbols referred to as bins. In general, a syntax element is an element of data produced by the video encoding process. For example, a syntax element may be a motion vector difference, a prediction mode, a coefficient level, a flag, a reference index, etc. The syntax elements are defined by the video coding standard, e.g., HEVC.

The binarization of a syntax element is also defined by the video coding standard, i.e., the standard dictates the content of the binary symbol string for each syntax element. That is, the coding standard defines a binarization scheme with unique mappings of syntax elements to sequences of bins. Examples of binarization include unary coding, truncated unary coding, exp-Golomb coding, and fixed length coding. Further, as part of binarization, a bin index (binIdx) is generated which indicates the location of the bin within the syntax element; the bin index in conjunction with the context selection logic indicates whether a bin may be classified as a regular (context-coded) bin or an equal probability (bypass-coded) bin. Whether a particular bin is to be classified as context-coded or a bypass-coded is also defined by the video coding standard. Context and bypass bins are explained in more detail below. A bin that is classified as context-coded is referred to as a context bin herein and a bin that is classified as bypass-coded is referred as a bypass bin herein.

The context modeler 102 selects a context model for a context bin. The video coding standard defines the available context models, the initial values of the context models, and which context model(s) should be used for bins of each syntax element. A context model includes a state value and a binary value of the most probable symbol MPS. The context models are updated throughout the coding process to track the probability estimations. That is, a bin is encoded based on the current state of the context model selected by the context modeler 102, and the context model is then updated to reflect the state transition and the MPS after the bin is coded. This updating corresponds to the feedback loop labeled "context update" in FIG. 1A.

The bin encoder 104 performs binary arithmetic coding of a bin using the context model (probability) selected by the context modeler 102. Binary arithmetic coding is based on the principle of recursive interval subdivision of an interval of width R. The current interval for each recursion, i.e., the internal state of the arithmetic coding, is represented by its lower bound L and its width (range) R. For each bin to be encoded, the current interval is subdivided into two subintervals, an interval of width $R_{LPS}=R*p_{LPS}$ and an interval of width $R_{MPS}=R-R_{LPS}$, where $p_{LPS}$ is an estimate of the probability of the least probable symbol (LPS), and MPS is the most probable symbol, with a probability of $1-p_{LPS}$. The value of $p_{LPS}$ is determined using the state value of the context model. Depending on whether the bin is the LPS or MPS, the corresponding subinterval is selected as the interval for the next bin.

The lower bound L and the range R are updated according to the lower bound and range of the selected subinterval. A renormalization process is then executed to rescale the lower bound L and the range R if needed. The renormalization process iteratively scales the range R to a minimum value of 256 with successive left shifts by 1 and may take from zero to 8 iterations depending on the value of the range R. In each iteration, the lower bound L is also scaled and a single output bit is generated to be added to the encoded bit stream. The polarity of the output bit is determined by the value of the lower bound L at each iteration. However, in certain cases, the polarity of an output bit may need to be resolved in subsequent iterations or in renormalization after coding one or more subsequent bins, i.e., carry propagation may occur. Such bits are referred to as outstanding bits. A count is kept of these outstanding bits and they are output when a future output bit resolves them to a known value. Thus, 0 to 8 output bits may be generated during renormalization plus any outstanding bits may also be output. The renormalization process corresponds to the feedback loop labeled "renormalization" in FIG. 1A.

The CABAC decoding process is the inverse of the encoding process and has similar feedback loops. Referring now to FIG. 1B, a CABAC decoder includes a bin decoder 112, a context modeler 110, and a de-binarizer 114. The context modeler 110 selects a context model for the next context bin to be decoded. As in the encoder, the context models are updated throughout the decoding process to track the probability estimations. That is, a bin is decoded based on the current state of the context model selected by the context modeler 110, and the context model is then updated to reflect the state transition and the MPS after the bin is decoded. This updating corresponds to the feedback loop labeled "context update" in FIG. 1B.

The bin decoder 112 performs binary arithmetic decoding of a bin using the context model selected by the context modeler 110. Binary arithmetic decoding, like binary arithmetic encoding, is based on the principle of recursive interval subdivision of an interval of width (range) R. The internal state of the arithmetic decoding for each recursion is represented by the range R and an offset 0 used to select the correct subinterval for a bin. A decoded bin is output at each recursion.

To decode a bin, the current interval is subdivided into two subintervals, an interval of width $R_{LPS}=R*p_{LPS}$ and an interval of width $R_{MPS}=R-R_{LPS}$, where $p_{LPS}$ is an estimate of the probability of the least probable symbol (LPS), and MPS is the most probable symbol, with a probability of $1-p_{LPS}$. The value of $p_{LPS}$ is determined using the state value of the context model. If the offset falls in the subinterval $R_{LPS}$, the bin is decoded as the LPS and the subinterval is selected as the interval for decoding the next bin; otherwise, the bin is decoded as the MPS and $R_{MPS}$ is selected as the interval for decoding the next bin.

The range R is updated to be the selected subinterval. A renormalization process is then executed to rescale the range R and update the offset O if needed. The renormalization process iteratively scales the range R to a minimum value of 256 with successive left shifts by 1. The number of iterations needed depends on the value of the range R. In each iteration, the offset 0 is also left shifted by 1 and the next bit in the bit stream is shifted into the offset. The renormalization process corresponds to the feedback loop labeled "range update" in FIG. 1B.

The de-binarizer 114 receives the decoded bins and operates to reverse the binarization of the binarizer 100 to reconstruct syntax elements.

Figure 2:
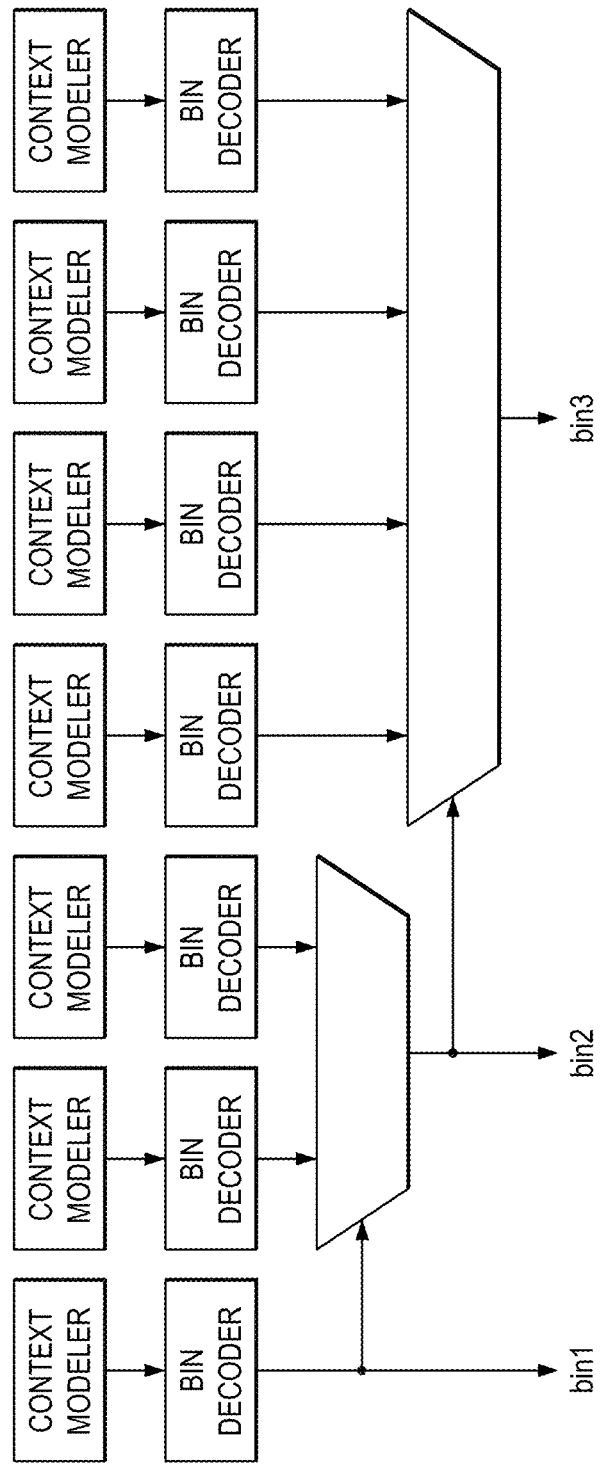
FIG. 2 is an example of speculative computation.

A common technique used in practice to increase the throughput of CABAC is speculative computation. In general, speculative computation for CABAC involves speculating or guessing what the mode (bypass or context) and context of the next bin will be before the current bin is resolved. Specifically, speculative computation involves computing several or all of the possible outcomes for the next bin before the current bin is resolved. However, using this technique to improve throughput increases the number of computations per bin. Consider the example of FIG. 2. The decoding of bin2 in parallel with bin1 requires 2× computations for bin2 to account the two possible values of bin1, bin1=0 and bin1=1. With three bin decoding, the number of computations for bin3 increases to four. The number of operations increases exponentially as the number of bins that are to be processed in parallel increases.

Figure 3A:
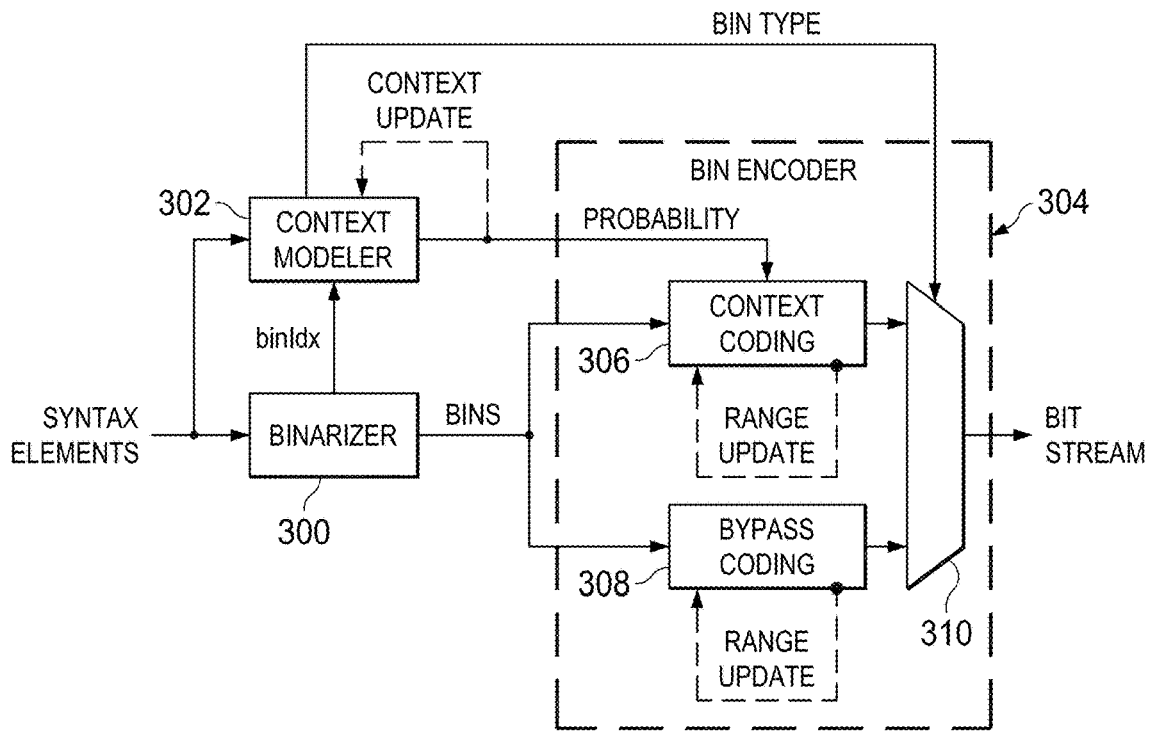
FIGS. 3A and 3B are block diagrams of, respectively, a prior art CABAC encoder and a prior art CABAC decoder.
Figure 3B:
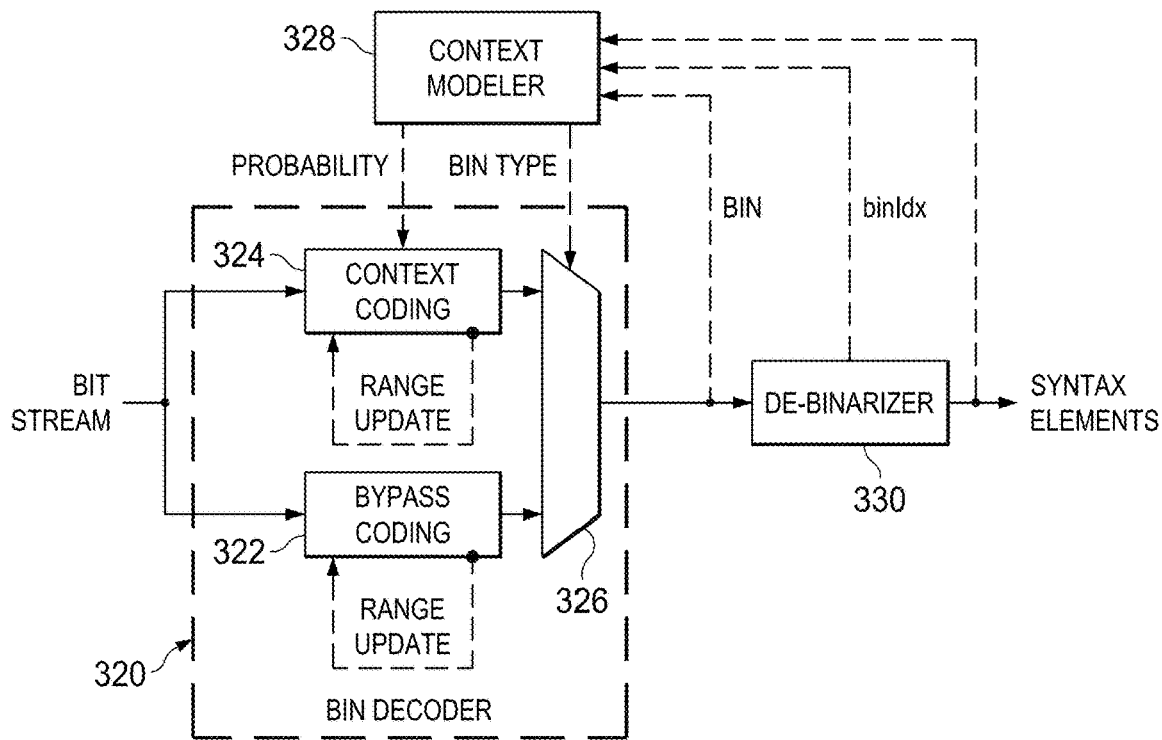

As was previously mentioned, a bin may be a context bin or a bypass bin. Thus, the bin encoder and the bin decoder can operate in two modes: context coding mode and bypass coding mode. FIGS. 3A and 3B are block diagrams of, respectively, a CABAC encoder with a bin encoder providing both modes and a CABAC decoder with a bin decoder providing both modes. In context coding mode, context bins are encoded/decoded according to the full context modeling process. This mode enables high coding efficiency but the throughput is limited due to the feedback loops. In bypass coding mode, the bypass bins have an assumed fixed probability of 0.5, which means that 0 and 1 occur in equal probability. In this mode, the context modeling is skipped and thus the feedback loop involved in the modeling. Thus several bypass coded bins can be coded in parallel without speculative computations. Furthermore, with the 0.5 probability, the range update in the arithmetic coding engine can be implemented with a simple shift, which reduces the delay in the range update loop. The reduced delay in the range update loop reduces the critical path of the arithmetic encoder/decoder allowing bypass bins to be processed at a higher throughput than context bins. However, the coding efficiency of bypass bins is lower than that of context bins.

Referring now to the CABAC encoder of FIG. 3A, the binarizer 300 converts syntax elements into strings of one or more binary symbols. The binarizer 300 directs each bin to either the context coding 306 or the bypass coding 308 of the bin encoder 304 based on a bin type determined by the context modeler 302. The binarizer also provides a bin index (binIdx) for each bin to the context modeler 302.

The context modeler 302 determines the bin type, i.e., context or bypass, for each bin. The order in which syntax elements should occur in the compressed video bit stream is known, so the type of each syntax element to be encoded can be determined prior to encoding based on the types of previously encoded syntax elements. Further, as previously mentioned, for each syntax element, the type (bypass or context) of each bin in the syntax element is known. Given the type of the syntax element being encoded and which bin in the syntax element is the next to be decoded, the context modeler 302 can determine whether a bin is a context bin or a bypass bin. The context modeler 302 provides the bin type to the multiplexer 310 and, although not specifically shown, to the binarizer 300.

If a bin is a context bin, the context modeler 302 also selects a context model for the bin to be used by the context coding 306. The context coding 306 operates as previously described to encode each context bin. The bypass coding 708 operates as previously described to encode each bypass bin. The bit values generated by the context coding 306 and bypass coding 708 are provided the multiplexer 310. The multiplexer 710 selects the output of the context coding 706 or the bypass coding 308 to be output into the compressed bit stream according to the bin type provided by the context modeler 302.

Referring now to the CABAC decoder of FIG. 3B, the bin decoder 320 receives the compressed video bit stream and directs the bit stream to the bypass coding 322 or the context coding 324 according to bin types determined by the context modeler 328.

The context modeler 328 determines the bin type for each bin to be decoded. As was previously explained, the order in which syntax elements should occur in the compressed video bit stream is known. Thus, the type of each syntax element to be decoded can be determined prior to decoding based on the types of previously decoded syntax elements. Further, for each syntax element, the type (bypass or context) of each bin in the syntax element is known. Given the type of the syntax element being decoded and which bin in the syntax element is the next to be decoded, the context modeler 328 can determine whether the next bin is a context bin or a bypass bin. The context modeler 328 provides the bin type to the multiplexer 326 and, although not specifically shown, to the bin decoder 320.

If a bin is a context bin, the context modeler 328 also selects a context model to be used by the context coding 324 to decode the bin. The context coding 324 operates as previously described to decode each context bin. The bypass coding 322 operates as previously described to decode each bypass bin. The bins generated by the context coding 324 and bypass coding 322 are provided the multiplexer 326. The multiplexer 326 selects the output of the context coding 324 or the bypass coding 322 to be provided to the de-binarizer 330 according to the bin type provided by the context modeler 328.

The de-binarizer 330 receives decoded bins for a syntax element from the bin decoder 320 and operates to reverse the binarization of the encoder to reconstruct the syntax elements.

Embodiments of the invention provide for CABAC coding with scalable throughput and coding efficiency. More specifically, CABAC coding is provided that permits selective reduction of the number of context coded bins to increase throughput. In some embodiments, a high throughput mode for CABAC encoding and decoding is provided that may be enabled to reduce the number of context coded bins for CABAC encoding and decoding and thus increase throughput. In some embodiments, when high throughput mode is enabled, all bins are bypass coded, i.e., all context bins are bypass coded as well the bypass bins. In some embodiments, when high throughput mode is enabled, some of the context bins are bypass coded as well as the bypass bins. In such embodiments, the particular context bins that are switched to bypass coding when high throughput mode is in effect are specified by the video coding standard. In some embodiments, high throughput mode may be enabled (and signaled) at the sequence, picture, or slice level. In some embodiments, high throughput mode may be enabled within a slice based on a threshold. In some embodiments, high throughput mode may be enabled based on a number of transform coefficients encoded/decoded.

Figure 4:
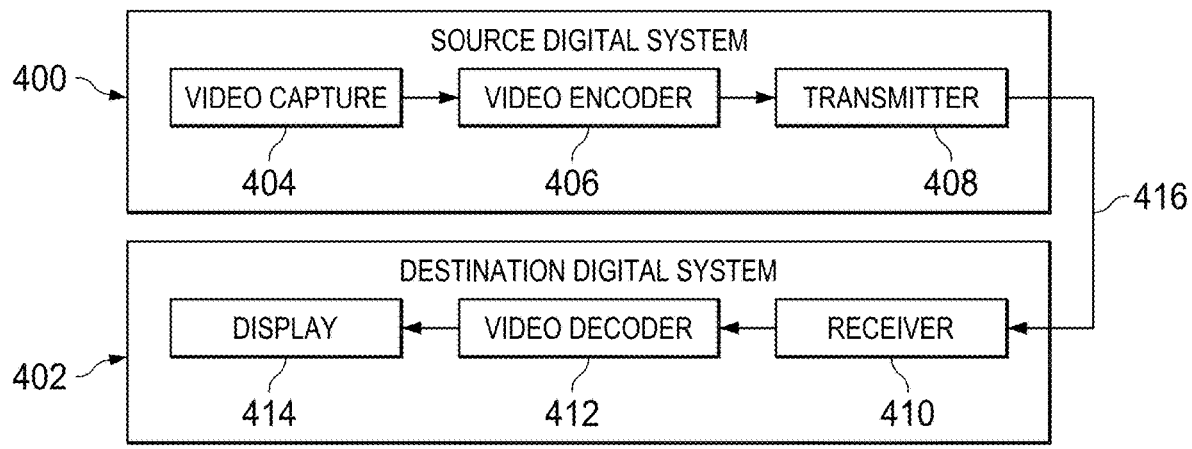
FIG. 4 is a block diagram of a digital system.

FIG. 4 shows a block diagram of a digital system that includes a source digital system 400 that transmits encoded video sequences to a destination digital system 402 via a communication channel 416. The source digital system 400 includes a video capture component 404, a video encoder component 406, and a transmitter component 408. The video capture component 404 is configured to provide a video sequence to be encoded by the video encoder component 406. The video capture component 404 may be, for example, a video camera, a video archive, or a video feed from a video content provider. In some embodiments, the video capture component 404 may generate computer graphics as the video sequence, or a combination of live video, archived video, and/or computer-generated video.

The video encoder component 406 receives a video sequence from the video capture component 404 and encodes it for transmission by the transmitter component 408. The video encoder component 406 receives the video sequence from the video capture component 404 as a sequence of pictures, divides the pictures into largest coding units (LCUs), and encodes the video data in the LCUs. The video encoder component 406 may be configured to perform CABAC encoding with high throughput mode during the encoding process as described herein. An embodiment of the video encoder component 406 is described in more detail herein in reference to FIG. 5.

The transmitter component 408 transmits the encoded video data to the destination digital system 402 via the communication channel 416. The communication channel 416 may be any communication medium, or combination of communication media suitable for transmission of the encoded video sequence, such as, for example, wired or wireless communication media, a local area network, or a wide area network.

The destination digital system 402 includes a receiver component 410, a video decoder component 412 and a display component 414. The receiver component 410 receives the encoded video data from the source digital system 400 via the communication channel 416 and provides the encoded video data to the video decoder component 412 for decoding. The video decoder component 412 reverses the encoding process performed by the video encoder component 406 to reconstruct the LCUs of the video sequence. The video decoder component 412 may be configured to perform CABAC decoding with high throughput mode during the decoding process as described herein. An embodiment of the video decoder component 412 is described in more detail below in reference to FIG. 7.

The reconstructed video sequence is displayed on the display component 414. The display component 414 may be any suitable display device such as, for example, a plasma display, a liquid crystal display (LCD), a light emitting diode (LED) display, etc.

In some embodiments, the source digital system 400 may also include a receiver component and a video decoder component and/or the destination digital system 402 may include a transmitter component and a video encoder component for transmission of video sequences both directions for video steaming, video broadcasting, and video telephony. Further, the video encoder component 406 and the video decoder component 412 may perform encoding and decoding in accordance with one or more video compression standards. The video encoder component 406 and the video decoder component 412 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 5:
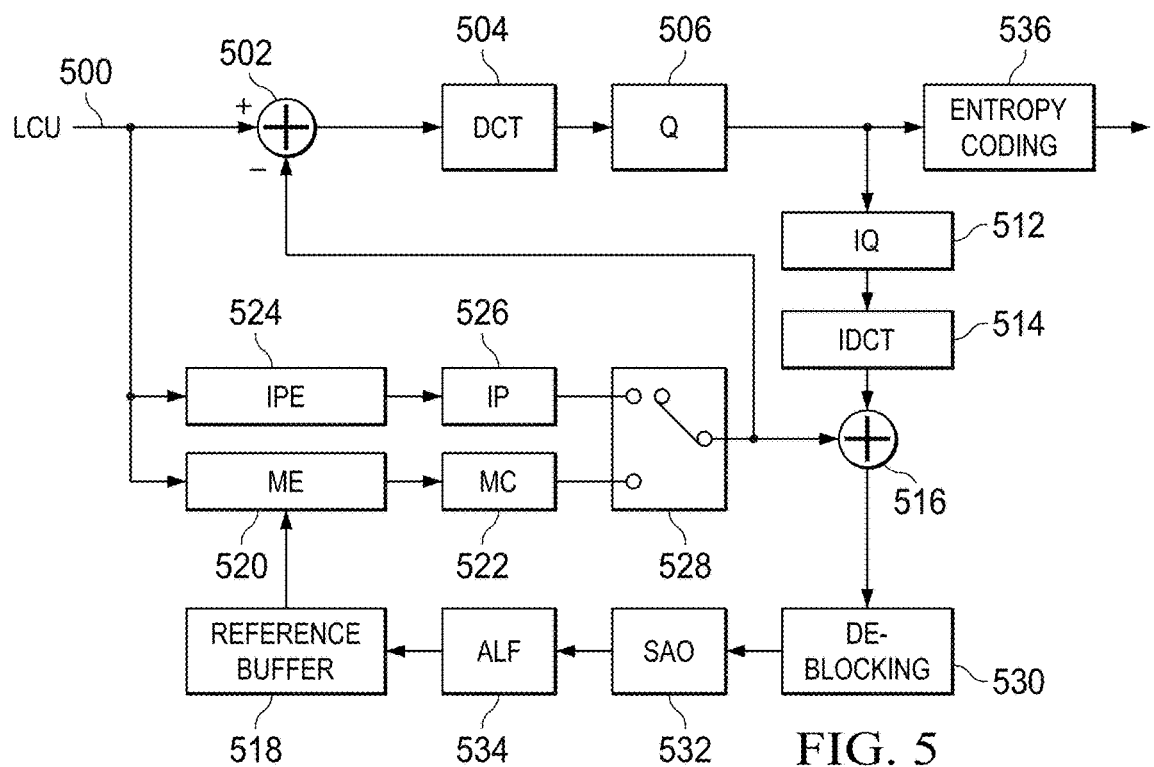
FIG. 5 is a block diagram of a video encoder.

FIG. 5 is a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs 500 of the input video sequence from the coding control component and encodes the LCUs 500 under the control of the coding control component to generate the compressed video stream.

The LCUs 500 in each picture are processed in row order. The LCUs 500 from the coding control component are provided as one input of a motion estimation component (ME) 520, as one input of an intra-prediction estimation component (IPE) 524, and to a positive input of a combiner 502 (e.g., adder or subtractor or the like). Further, although not specifically shown, the prediction mode of each picture as selected by the coding control component is provided to a mode decision component 528 and the entropy coding component 536.

The storage component 518 provides reference data to the motion estimation component 520 and to the motion compensation component 522. The reference data may include one or more previously encoded and decoded pictures, i.e., reference pictures.

The motion estimation component 520 provides motion data information to the motion compensation component 522 and the entropy coding component 536. More specifically, the motion estimation component 520 performs tests on CUs in an LCU based on multiple inter-prediction modes (e.g., skip mode, merge mode, and normal or direct inter-prediction), PU sizes, and TU sizes using reference picture data from storage 518 to choose the best CU partitioning, PU/TU partitioning, inter-prediction modes, motion vectors, etc. based on coding cost, e.g., a rate distortion coding cost. To perform the tests, the motion estimation component 520 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 520 provides the motion vector (MV) or vectors and the prediction mode for each PU in the selected CU partitioning to the motion compensation component (MC) 522.

The motion compensation component 522 receives the selected inter-prediction mode and mode-related information from the motion estimation component 520 and generates the inter-predicted CUs. The inter-predicted CUs are provided to the mode decision component 528 along with the selected inter-prediction modes for the inter-predicted PUs and corresponding TU sizes for the selected CU/PU/TU partitioning. The coding costs of the inter-predicted CUs are also provided to the mode decision component 528.

The intra-prediction estimation component 524 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 524 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 524 provides the selected intra-prediction modes for the PUs, and the corresponding TU sizes for the selected CU partitioning to the intra-prediction component (IP) 526. The coding costs of the intra-predicted CUs are also provided to the intra-prediction component 526.

The intra-prediction component 526 (IP) receives intra-prediction information, e.g., the selected mode or modes for the PU(s), the PU size, etc., from the intra-prediction estimation component 524 and generates the intra-predicted CUs. The intra-predicted CUs are provided to the mode decision component 528 along with the selected intra-prediction modes for the intra-predicted PUs and corresponding TU sizes for the selected CU/PU/TU partitioning. The coding costs of the intra-predicted CUs are also provided to the mode decision component 528.

The mode decision component 528 selects between intra-prediction of a CU and inter-prediction of a CU based on the intra-prediction coding cost of the CU from the intra-prediction component 526, the inter-prediction coding cost of the CU from the motion compensation component 522, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 536.

The output of the mode decision component 528, i.e., the predicted PUs, is provided to a negative input of the combiner 502 and to the combiner 538. The associated transform unit size is also provided to the transform component 504. The combiner 502 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 504 performs block transforms on the residual CUs to convert the residual pixel values to transform coefficients and provides the transform coefficients to a quantize component 506. More specifically, the transform component 504 receives the transform unit sizes for the residual CU and applies transforms of the specified sizes to the CU to generate transform coefficients. Further, the quantize component 506 quantizes the transform coefficients based on quantization parameters (QPs) and quantization matrices provided by the coding control component and the transform sizes and provides the quantized transform coefficients to the entropy coding component 536 for coding in the bit stream.

The entropy coding component 536 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the CU/PU/TU partitioning of an LCU, the prediction modes for the CUS, and the quantized transform coefficients for the CUS. The entropy coding component 536 encodes the syntax elements using an embodiment of CABAC encoding with high throughput mode as described herein.

The LCU processing component 542 includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 512, which outputs a reconstructed version of the transform result from the transform component 504. The dequantized transform coefficients are provided to the inverse transform component (IDCT) 514, which outputs estimated residual information representing a reconstructed version of a residual CU. The inverse transform component 514 receives the transform unit size used to generate the transform coefficients and applies inverse transform(s) of the specified size to the transform coefficients to reconstruct the residual values. The reconstructed residual CU is provided to the combiner 538.

The combiner 538 adds the original predicted CU to the residual CU to generate a reconstructed CU, which becomes part of reconstructed picture data. The reconstructed picture data is stored in a buffer (not shown) for use by the intra-prediction estimation component 524.

Various in-loop filters may be applied to the reconstructed picture data to improve the quality of the reference picture data used for encoding/decoding of subsequent pictures. The in-loop filters may include a deblocking filter 530, a sample adaptive offset filter (SAO) 532, and an adaptive loop filter (ALF) 534. The in-loop filters 530, 532, 534 are applied to each reconstructed LCU in the picture and the final filtered reference picture data is provided to the storage component 518. In some embodiments, the ALF component 534 is not present.

Figure 6:
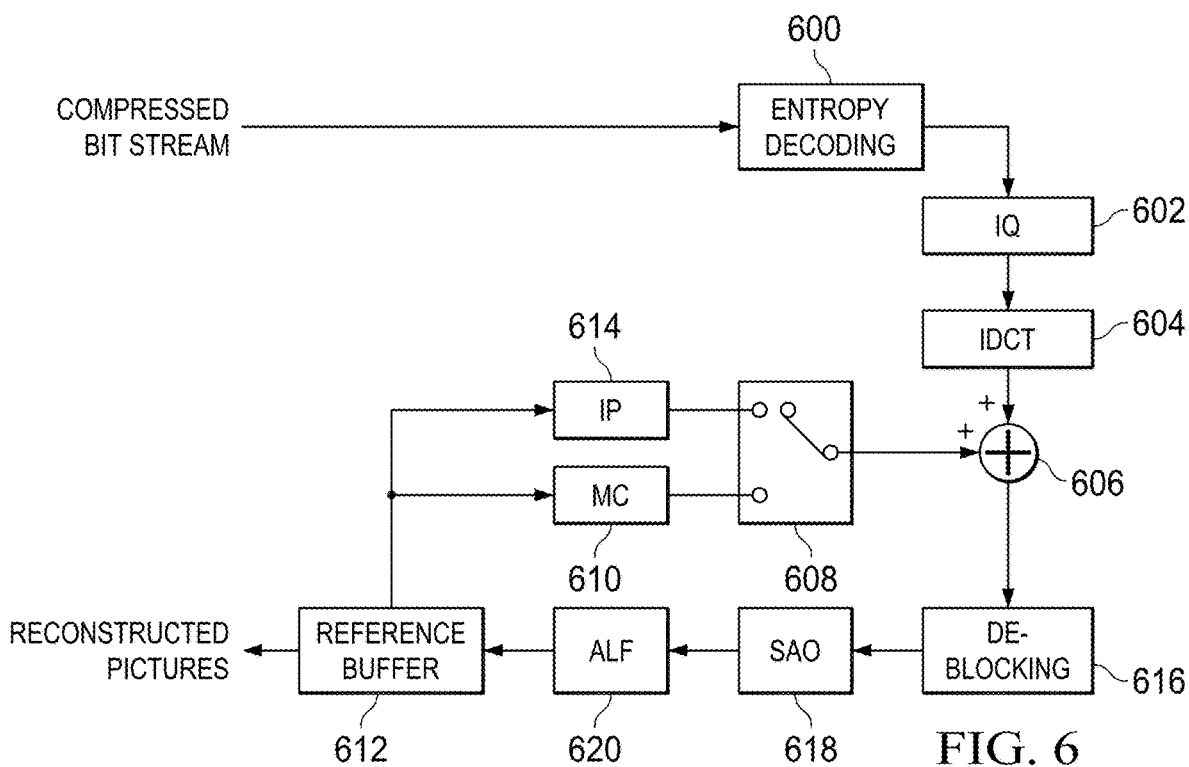
FIG. 6 is a block diagram of a video decoder.

FIG. 6 is a block diagram of an example video decoder. The entropy decoding component 600 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, in-loop filter parameters, etc. The entropy decoding component 600 decodes the syntax elements using an embodiment of CABAC decoding with high throughput mode as described herein. The decoded syntax elements are passed to the various components of the decoder as needed. For example, decoded prediction modes are provided to the intra-prediction component (IP) 614 or motion compensation component (MC) 610. If the decoded prediction mode is an inter-prediction mode, the entropy decoder 600 reconstructs the motion vector(s) as needed and provides the motion vector(s) to the motion compensation component 610.

The inverse quantize component (IQ) 602 de-quantizes the quantized transform coefficients of the CUs. The inverse transform component 604 transforms the frequency domain data from the inverse quantize component 602 back to the residual CUs. That is, the inverse transform component 604 applies an inverse unit transform, i.e., the inverse of the unit transform used for encoding, to the de-quantized residual coefficients to produce reconstructed residual values of the CUS.

A residual CU supplies one input of the addition component 606. The other input of the addition component 606 comes from the mode switch 608. When an inter-prediction mode is signaled in the encoded video stream, the mode switch 608 selects predicted PUs from the motion compensation component 610 and when an intra-prediction mode is signaled, the mode switch selects predicted PUs from the intra-prediction component 614.

The motion compensation component 610 receives reference data from the storage component 612 and applies the motion compensation computed by the encoder and transmitted in the encoded video bit stream to the reference data to generate a predicted PU. That is, the motion compensation component 610 uses the motion vector(s) from the entropy decoder 600 and the reference data to generate a predicted PU.

The intra-prediction component 614 receives reconstructed samples from previously reconstructed PUs of a current picture from the storage component 612 and performs the intra-prediction computed by the encoder as signaled by an intra-prediction mode transmitted in the encoded video bit stream using the reconstructed samples as needed to generate a predicted PU.

The addition component 606 generates a reconstructed CU by adding the predicted PUs selected by the mode switch 608 and the residual CU. The output of the addition component 606, i.e., the reconstructed CUs, is stored in the storage component 612 for use by the intra-prediction component 614.

In-loop filters may be applied to reconstructed picture data to improve the quality of the decoded pictures and the quality of the reference picture data used for decoding of subsequent pictures. The in-loop filters are the same as those of the encoder, i.e., a deblocking filter 616, a sample adaptive offset filter (SAO) 618, and an adaptive loop filter (ALF) 620. The in-loop filters may be applied on an LCU-by-LCU basis and the final filtered reference picture data is provided to the storage component 612. In some embodiments, the ALF component 620 is not present.

Figure 7:
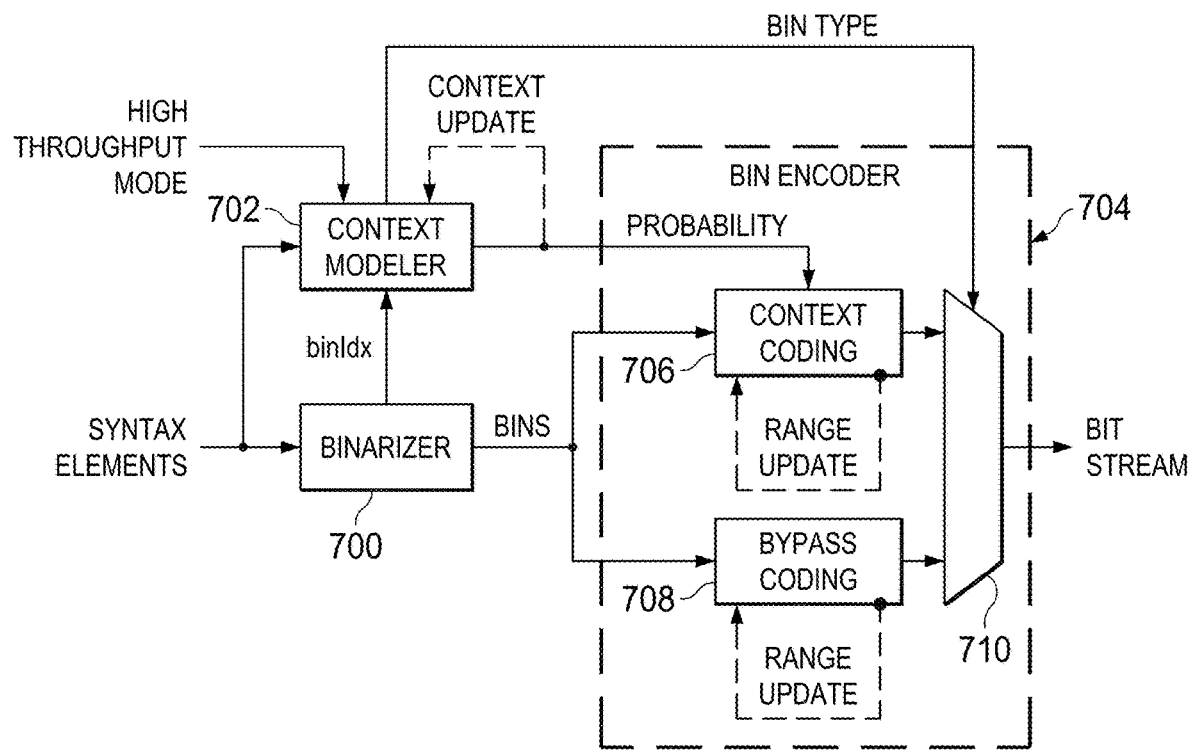
FIG. 7 is a block diagram of a CABAC encoder with high throughput mode.

FIG. 7 is a block diagram of a CABAC encoder, e.g., the entropy coding component 536 of FIG. 5, configured to operate in normal mode or high throughput mode. In normal mode, all context bins are context coded and all bypass bins are bypass coded as in the prior art. In high throughput mode, the number of context-coded bins is reduced to increase the throughput of the CABAC encoder and the CABAC decoder. As is described in more detail herein, in some embodiments, high throughput is enabled/disabled by the binarizer 700. And, in some embodiments, high throughput mode is enabled external to the CABAC encoder, e.g., at the sequence, picture, and/or slice level and signaled, respectively, in a sequence parameter set, picture parameter set, or slice header. The operation of the CABAC encoder is first explained without consideration of how high throughput mode is enabled.

For both normal and high throughput mode, the binarizer 700 and the context coding 706 and bypass coding 708 of the bin encoder 704 provide functionality as previously described for components of the same name in FIG. 3A. The context modeler 702 includes functionality to determine the bin type of bins, to provide the bin types to the multiplexer 710 and the binarizer 700, and to select context models for context bins to be used by the context coding 706. The context modeler 702 also includes functionality to determine whether or not high throughput mode is enabled and to change the bin type of context bins when high throughput mode is enabled to force these context bins to be bypass coded, thus reducing the number of context-coded bins.

More specifically, when high throughput mode is not enabled, i.e., in normal mode, the context modeler 702 determines the bin type for each bin and determines the context model for context bins. When high throughput mode is enabled, the context modeler 702 also determines the bin type for each bin. In some embodiments, the context modeler 702 changes the bin type for all context bins to bypass when high throughput mode is enabled. In such embodiments, the context modeler 702 may not select context models for context bins while high throughput mode is enabled as the context models are not needed. In some embodiments, the context modeler 702 changes the bin type for specified context bins to bypass when high throughput mode is enabled. For example, as is explained in more detail herein, the bin types of some or all of the context bins generated for encoding coefficient transforms may be changed to bypass while the bin types of other context bins are not changed. In such embodiments, the particular context bins to be bypass coded when high throughput mode is enabled are specified by the coding standard. In such embodiments, the context modeler 702 may not select context models for the particular context bins while high throughput mode is enabled as the context models for these bins are not needed. Note that changing the bin type of a context bin to bypass causes the binarizer 700 to direct the context bin to the bypass coding 708 rather than to the context coding 706.

In some embodiments, the binarizer 700 includes functionality to enable high throughput mode for a sequence of syntax elements being processed based on a number of transform coefficients that have been encoded in the sequence of syntax elements and to disable high throughput mode at the end of the sequence (if needed). A sequence of syntax elements may be, for example, the syntax elements for a picture, a slice, a coding unit, a transform unit (TU), or a sub-block of a TU. More specifically, as the syntax elements in the sequence are processed, the binarizer 700 counts the number of transform coefficients encoded. In some embodiments, both zero and non-zero (significant) transform coefficients are counted. In some embodiments, only non-zero transform coefficients are counted. If the number of encoded transform coefficients reaches a specified threshold, the binarizer 700 enables high throughput mode for the remainder of the sequence. In some embodiments, the value of the threshold, i.e., the number of coefficients to be encoded before enabling high throughput mode, is specified by the video coding standard, e.g., as a constant or as a value that specified in a particular level defined by the standard.

In some embodiments, the binarizer 700 includes functionality to enable high throughput mode as the syntax elements for a slice are encoded based on a number of bins generated and to disable high throughput mode at the end of the slice (if needed). More specifically, as the syntax elements in the slice are processed, the binarizer 700 counts the number of bins generated. In some embodiments, both context and bypass bins are counted. In some embodiments, only context bins are counted. If the number of bins reaches a specified threshold, the binarizer 700 enables high throughput mode for the remainder of the slice. In some embodiments, the value of the threshold, i.e., the number of bins to be generated before enabling high throughput mode, is specified by the video coding standard, e.g., as a constant or as a value that specified in a particular level defined by the standard.

In some embodiments, the bin encoder 704 includes functionality to enable high throughput mode as the syntax elements for a slice are encoded based on a number of bits output in the compressed bit stream. More specifically, as the syntax elements in the slice are processed, the bin encoder 704 counts the number of bits output. If the number of bits reaches a specified threshold, the bin encoder 704 enables high throughput mode for the remainder of the slice. In some embodiments, the value of the threshold, i.e., the number of bits to be output before enabling high throughput mode, is specified by the video coding standard, e.g., as a constant or as a value that specified in a particular level defined by the standard.

Figure 8:
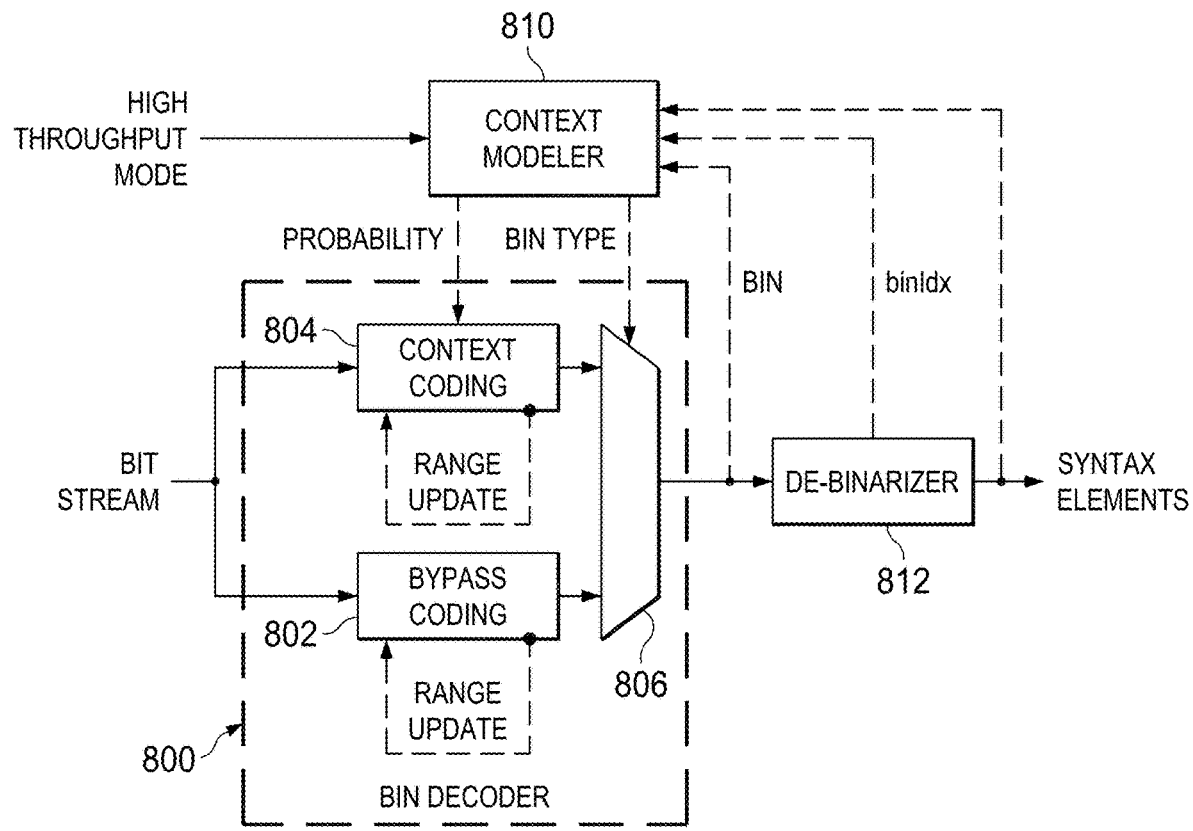
FIG. 8 is a block diagram of a CABAC decoder with high throughput mode.

FIG. 8 is a block diagram of a CABAC decoder, e.g., the entropy decoding component 600 of FIG. 6, configured to operate in normal mode or high throughput mode. In general, the CABAC decoder reverses the entropy encoding of the CABAC encoder to recover the encoded syntax elements from the compressed bit stream. In some embodiments, high throughput mode is enabled by signaling in the bit stream, e.g., in a sequence parameter set, a picture parameter set, and/or a slice header. In some embodiments, high throughput mode is enabled/disabled by the de-binarizer 812. The operation of the CABAC decoder is first explained without consideration of how high throughput mode is enabled.

For both normal and high throughput mode, the de-binarizer 812 and the context coding 804 and bypass coding 802 of the bin decoder 800 provide functionality as previously described for components of the same name in FIG. 3B. The context modeler 810 includes functionality to determine the bin type of bins, to provide the bin types to the multiplexer 806 and the de-binarizer 812, and to select context models for context bins to be used by the context coding 804. The context modeler 810 also includes functionality to determine whether or not high throughput mode is enabled and to change the bin type of expected context bins when high throughput mode is enabled to force the bits for these context bins to be decoded in bypass mode by the bypass coding 802.

More specifically, when high throughput mode is not enabled, i.e., in normal mode, the context modeler 810 determines the bin type for each bin to be decoded and determines the context model for context bins. When high throughput mode is enabled, the context modeler 810 also determines the bin type for each bin to be decoded. In some embodiments, the context modeler 810 changes the bin type for all context bins to bypass when high throughput mode is enabled. In such embodiments, the context modeler 810 may not select context models for context bins while high throughput mode is enabled as the context models are not needed. In some embodiments, the context modeler 810 changes the bin type for specified context bins to bypass when high throughput mode is enabled. For example, as is explained in more detail herein, the bin types of some or all of the context bins of coefficient transforms may be changed to bypass while the bin types of other context bins are not changed. In such embodiments, the particular context bins to be bypass decoded when high throughput mode is enabled are specified by the coding standard. In such embodiments, the context modeler 810 may not select context models for the particular context bins while high throughput mode is enabled as the context models for these bins are not needed. Note that changing the bin type of a context bin to bypass causes the bin decoder 800 to direct the bit stream to the bypass coding 802 rather than to the context coding 804.

In some embodiments, the de-binarizer 812 includes functionality to enable high throughput mode for a sequence of syntax elements being decoded based on a number of transform coefficients that have been decoded in the sequence of syntax elements and to disable high throughput mode at the end of the sequence (if needed). A sequence of syntax elements may be, for example, the syntax elements for a picture, a slice, a coding unit, a transform unit (TU), or a sub-block of a TU. More specifically, as the syntax elements in the sequence are processed, the de-binarizer 812 counts the number of transform coefficients decoded. In some embodiments, both zero and non-zero (significant) transform coefficients are counted. In some embodiments, only non-zero transform coefficients are counted. If the number of decoded transform coefficients reaches a specified threshold, the de-binarizer 812 enables high throughput mode for the remainder of the sequence. The value of this threshold is the same as that used in the CABAC encoder that generated the compressed bit stream.

In some embodiments, the de-binarizer 812 includes functionality to enable high throughput mode as the syntax elements for a slice are encoded based on a number of bins decoded and to disable high throughput mode at the end of the slice (if needed). More specifically, as the decoded bins of the slice are processed, the de-binarizer 812 counts the number of bins. In some embodiments, both context and bypass bins are counted. In some embodiments, only context bins are counted. If the number of bins reaches a specified threshold, the de-binarizer 812 enables high throughput mode for the remainder of the slice. The value of this threshold is the same as that used in the CABAC encoder that generated the compressed bit stream.

In some embodiments, the bin decoder 800 includes functionality to enable high throughput mode as the bits for a slice are decoded based on a number of bits read from the compressed bit stream. More specifically, as the bits for the slice are decoded, the bin decoder 800 counts the number of bits. If the number of bits reaches a specified threshold, the bin decoder 800 enables high throughput mode for the remainder of the slice. The value of this threshold is the same as that used in the CABAC encoder that generated the compressed bit stream.

Figure 9:
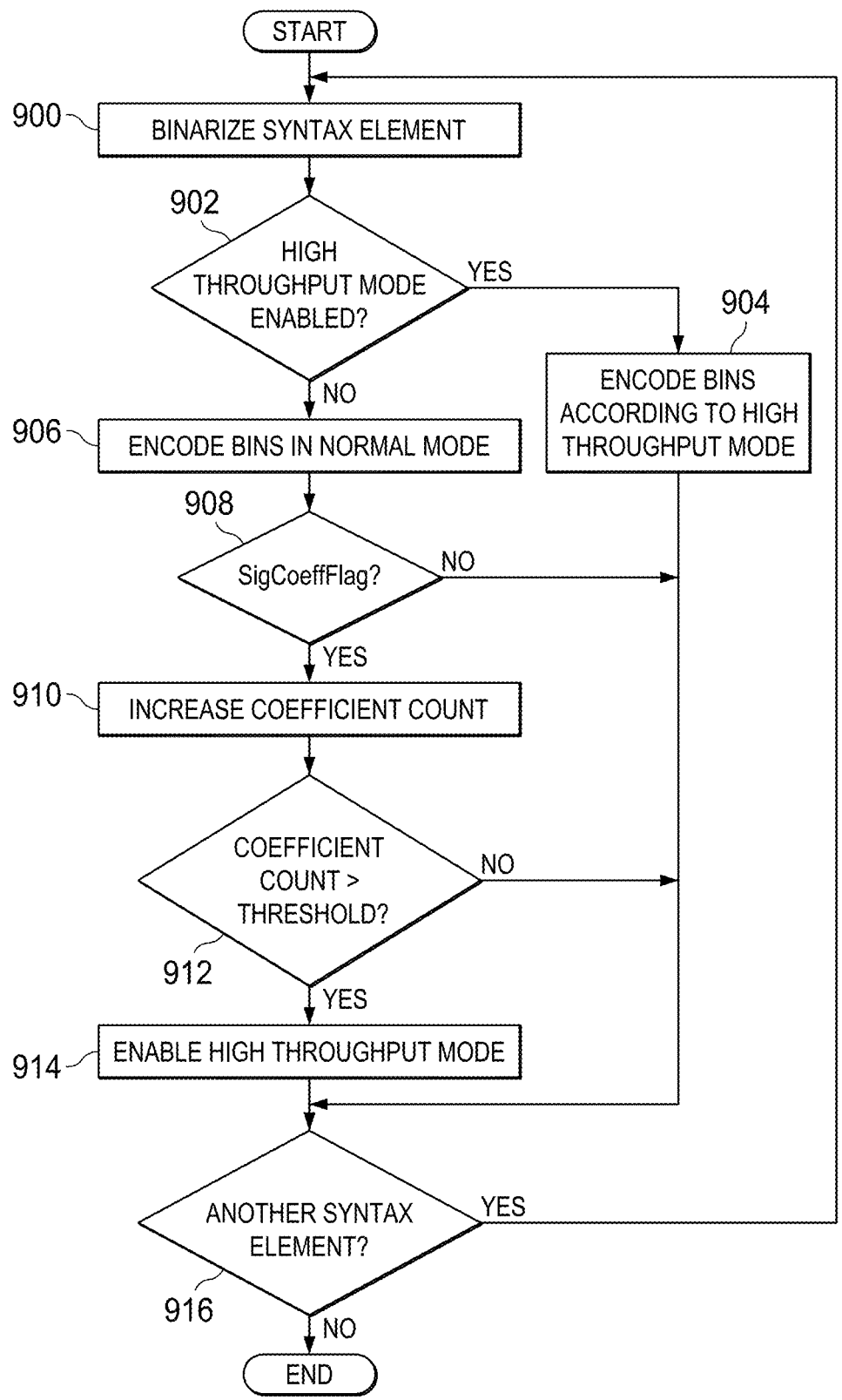
FIGS. 9-16 are flow diagrams of methods.

FIG. 9 is a flow diagram of a method for CABAC encoding with high throughput mode. In general, this method switches from normal CABAC mode to a high throughput mode during processing of a sequence of syntax elements based on a number of transform coefficients that have been encoded in the sequence of syntax elements. A sequence of syntax elements may be, for example, the syntax elements for a picture, a slice, a coding unit, a transform unit (TU), or a sub-block of a TU. The method begins at the beginning of a sequence of syntax elements and ends at the end of the sequence. That is, if high throughput mode is enabled during the CABAC encoding of the sequence of syntax elements, it is disabled at the end of the sequence. The count of transform coefficients is also reset.

Figure 10:
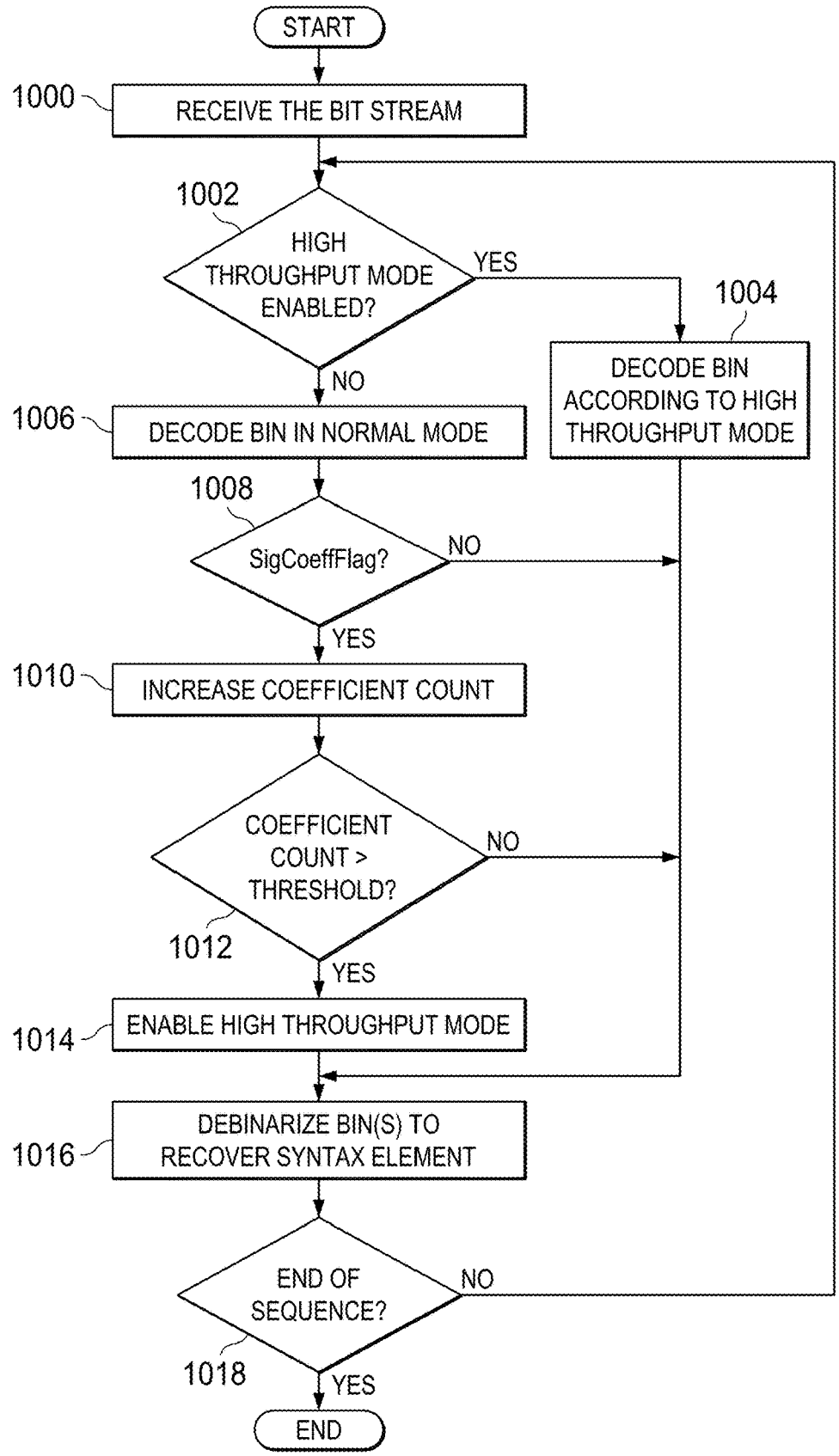

For example purposes in the description of this method and the method of FIG. 10, the following five syntax elements are assumed for signaling transform coefficient values: 1) significant_coeff_flag (SigCoeffFlag) which indicates the significance of each coefficient; 2) coeff_abs_level_greater1_flag (Greater1Flag) which indicates for each non-zero coefficient (i.e., when SigCoeffFlag) is 1) whether the coefficient value is larger than one; 3) coeff_abs_level_greater2_flag (Greater2Flag which indicates whether the coefficient value is larger than two for each coefficient with a value larger than one (i.e., when Greater1Flag is 1); 4) coeff_sign_flag (SignFlag) which indicates sign information of the non-zero coefficients; and 5) coeff_abs_level_minus3 (LevelMinus3) which indicates the absolute value of the remaining value, i.e., the result of (abs(coefficient value)−3) is signaled for each coefficient with a value larger than two (i.e., when Greater2Flag is 1). The bins of SigCoeffFlag, Greater1Flag, and Greater2Flag are context bins and the bins of SignFlag and LevelMinus3 are bypass bins. One of ordinary skill in the art will understand embodiments in which the syntax elements and/or the bin types of the syntax elements differ from this example.

Initially, a syntax element of the sequence is binarized 900 to generate the bin or bins corresponding to the syntax element. If high throughput mode is not enabled 902, the bin or bins are encoded 906 in normal mode. That is, if a bin is a context bin, it is context coded and if a bin is a bypass bin, it is bypass coded. If the syntax element is not the SigCoeffFlag for a transform coefficient 908, processing continues with the next syntax element in the sequence, if any 916.

If the syntax element is the SigCoeffFlag for a transform coefficient 908, then a coefficient count is increased 910. In some embodiments, the coefficient count is increased for all SigCoeffFlags and, in other embodiments, the coefficient count is increased only if the SigCoeffFlag indicates a significant coefficient, e.g., SigCoeffFlag=1. The coefficient count is then compared 912 to a threshold. In some embodiments, the value of the threshold, i.e., the number of coefficients to be encoded before enabling high throughput mode, is specified by the video coding standard, e.g., as a constant or as a value that specified in a particular level defined by the standard. If the coefficient count has not yet reached the threshold 912, processing continues with the next syntax element in the sequence, if any 916. If the coefficient count is greater than 912 the threshold, then high throughput mode is enabled 914 and processing continues with the next syntax element in the sequence, if any 916.

If high throughput mode is enabled 902, the bin or bins are encoded 904 in high throughput mode. Processing then continues with the next syntax element in the sequence, if any 916. In high throughput mode, all bypass bins are bypass coded as in normal mode. Further, any context bins for syntax elements other than those used for encoding transform coefficients are context coded. However, the number of context-coded bins used to encode transform coefficients is reduced. In some embodiments, all context bins used for encoding transform coefficients are bypass coded, e.g., the context bins for each SigCoeffFlag, Greater1Flag, and Greater2Flag are bypass coded rather than be context coded. In some embodiments, a specified subset of the context bins used for encoding transform coefficients are bypass coded. For example, the context bins for each SigCoeffFlag may be context coded while the context bins for each Greater1Flg and Greater2Flg may be bypass coded. The particular context bins that are to be bypass coded when high throughput mode is enabled are specified by the video coding standard.

FIG. 10 is a flow diagram of a method for CABAC decoding with high throughput mode. In general, this method switches from normal CABAC mode to a high throughput mode during decoding of a sequence of syntax elements based on a number of transform coefficients that have been decoded in the sequence of syntax elements. A sequence of syntax elements may be, for example, the syntax elements for a picture, a slice, a coding unit, a transform unit (TU), or a sub-block of a TU. The method begins at the beginning of a sequence of syntax elements and ends at the end of the sequence. That is, if high throughput mode is enabled during the CABAC decoding of the sequence of syntax elements, it is disabled at the end of the sequence. The count of transform coefficients is also reset.

Initially, the compressed bit stream 1000 is received. If high throughput mode is not enabled 1002, a bin is decoded 1006 from the bit stream in normal mode. That is, if the expected bin is a context bin, it is context decoded and if the expected bin is a bypass bin, it is bypass decoded. If the decoded bin is not the SigCoeffFlag for a transform coefficient 1008, debinarization is performed 1016 (if all bins of the expected syntax element have been decoded) to recover a syntax element and processing of the sequence continues unless the end of the sequence has been reached 1018.

If the decoded bin is the SigCoeffFlag for a transform coefficient 1008, then a coefficient count is increased 1010 and the coefficient count is compared 1012 to a threshold. Note that in some embodiments, the coefficient count is increased for all SigCoeffFlags; in other embodiments, the coefficient count is increased only if the SigCoeffFlag indicates a significant coefficient. The coefficient count is then compared 1012 to a threshold. The value of this threshold is the same as that used by the CABAC encoder that generated the compressed bit stream. If the coefficient count has not yet reached the threshold 1012, debinarization is performed 1016 (if all bins of the expected syntax element have been decoded) to recover a syntax element and processing of the sequence continues unless the end of the sequence has been reached 1018. If the coefficient count is greater than 1012 the threshold, then high throughput mode is enabled 1014, debinarization is performed 1016 (if all bins of the expected syntax element have been decoded) to recover a syntax element, and processing of the sequence continues unless the end of the sequence has been reached 1018.

If high throughput mode is enabled 1002, a bin is decoded 1004 from the bit stream in high throughput mode. Debinarization is then performed 1016 (if all bins of the expected syntax element have been decoded) to recover a syntax element and processing of the sequence continues unless the end of the sequence has been reached 1018. In high throughput mode, all bypass bins are bypass decoded as in normal mode. Further, any context bins for syntax elements other than those used for encoding transform coefficients are context decoded. In some embodiments, all context bins used for encoding transform coefficients are bypass decoded, e.g., the context bins for each SigCoeffFlag, Greater1Flag, and Greater2Flag are bypass decoded. In some embodiments, a specified subset of the context bins used for encoding transform coefficients are bypass decoded. For example, the context bins for each SigCoeffFlag may be context decoded while the context bins for each Greater1Flg and Greater2Flg may be bypass decoded. The particular context bins that are to be bypass decoded when high throughput mode is enabled are specified by the video coding standard.

Figure 11:
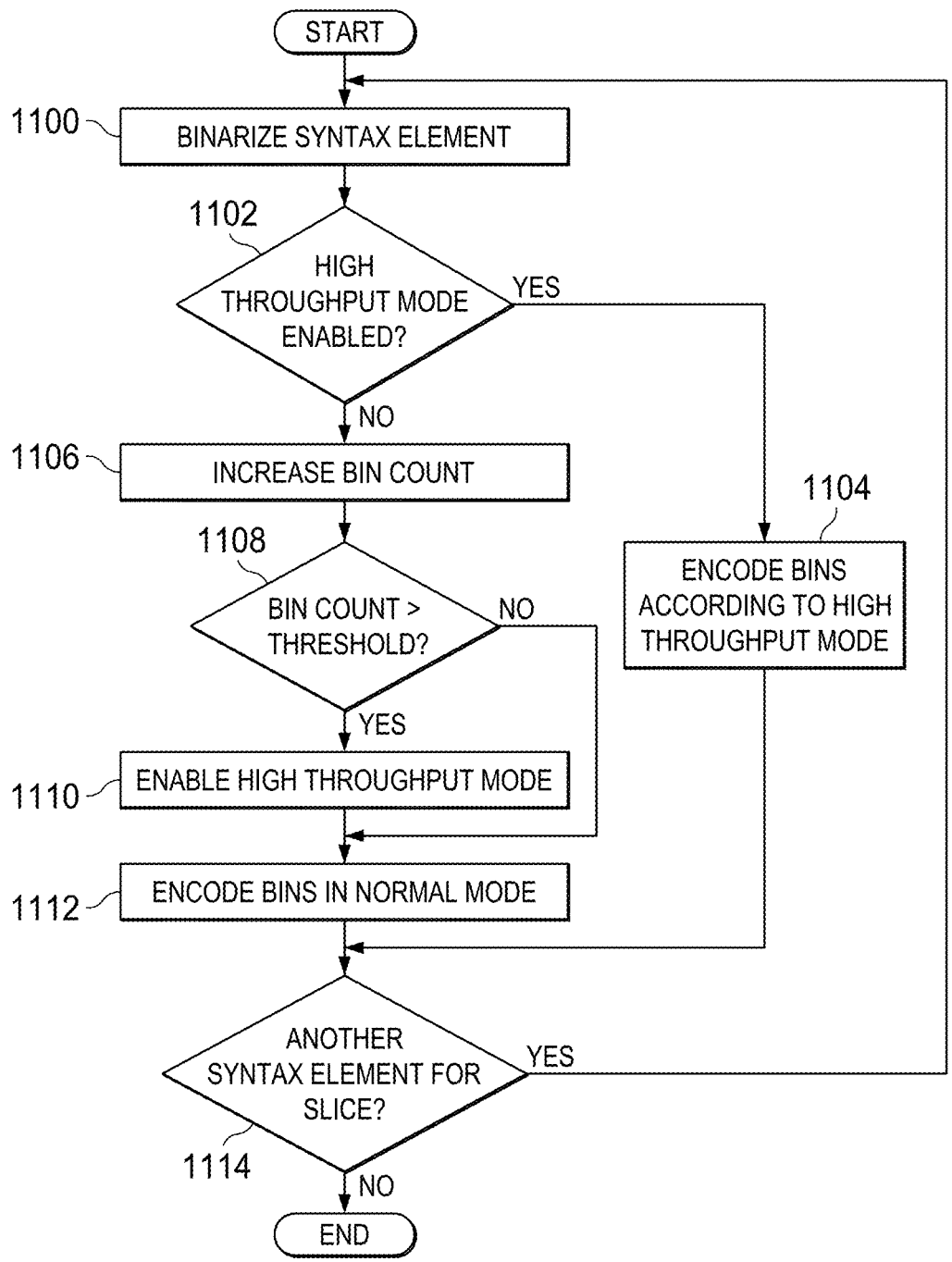

FIG. 11 is a flow diagram of a method for CABAC encoding with high throughput mode. In general, this method switches from normal CABAC mode to a high throughput mode during processing of the syntax elements of a slice based on a number of bins generated as the syntax elements are processed. The method begins at the beginning of a slice and ends at the end of the slice. If high throughput mode is enabled during the CABAC encoding of the syntax elements of the slice, it is disabled at the end of the slice. The count of bins is also reset.

Initially, a syntax element of the slice is binarized 1100 to generate the bin or bins corresponding to the syntax element. If high throughput mode is not enabled 1102, a bin count is increased 1106 by the number of bins generated. In some embodiments, the bin count is increased by the number of all bins generated; in other embodiments, the bin count is increased only by the number of context bins generated. The bin count is then compared 1108 to a threshold. In some embodiments, the value of the threshold, i.e., the number of bins to be generated before enabling high throughput mode, is specified by the video coding standard, e.g., as a constant or as a value that specified in a particular level defined by the standard. If the bin count is greater than the threshold 1108, then high throughput mode is enabled 1110. The bin or bins are encoded 1112 in normal mode. That is, if a bin is a context bin, it is context coded and if a bin is a bypass bin, it is bypass coded. Processing then continues with the next syntax element in the slice, if any 1114.

If high throughput mode is enabled 1102, the bin or bins are encoded 1104 in high throughput mode. Processing then continues with the next syntax element in the slice, if any 1114. In high throughput mode, all bypass bins are bypass coded as in normal mode. In some embodiments, all context bins are also bypass coded. In some embodiments, specified context bins are bypass coded and the other context bins are context coded. For example, as is explained in more detail herein, some or all of the context bins generated for encoding coefficient transforms may be bypass coded while other context bins are context coded. In such embodiments, the particular context bins to be bypass coded when high throughput mode is enabled are specified by the video coding standard.

Figure 12:
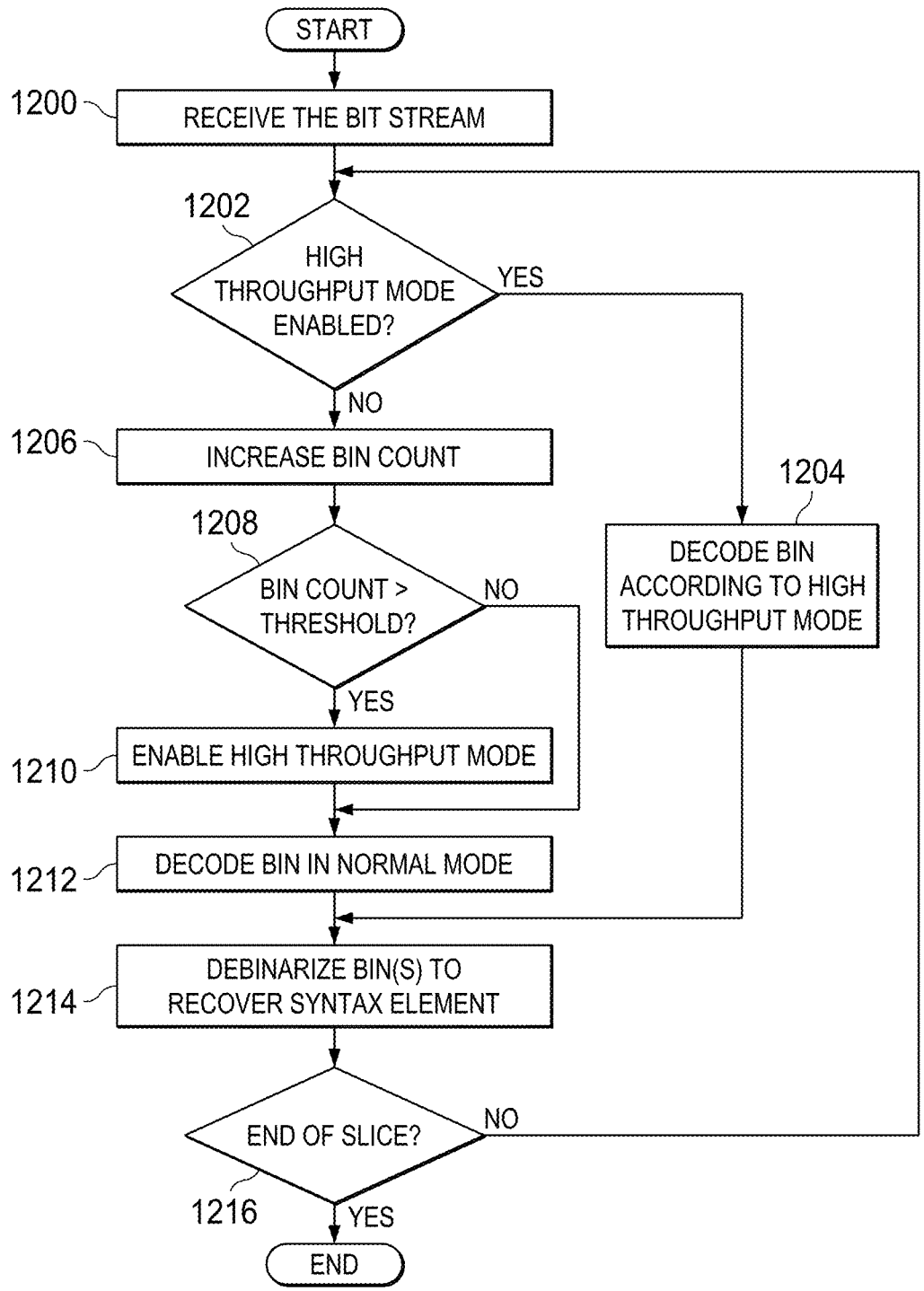

FIG. 12 is a flow diagram of a method for CABAC decoding with high throughput mode. In general, this method switches from normal CABAC mode to a high throughput mode during decoding of the syntax elements of a slice based on a number of bins generated as the syntax elements are decoded. The method begins at the beginning of a slice and ends at the end of the slice. If high throughput mode is enabled during the CABAC encoding of the syntax elements of the slice, it is disabled at the end of the slice. The count of bins is also reset.

Initially, the compressed bit stream 1200 is received. If high throughput mode is not enabled 1202, a bin count is increased 1206 by one. In some embodiments, the bin count is increased for each bin decoded; in other embodiments, the bin count is increased only if the decoded bin is a context bin. The bin count is then compared 1208 to a threshold. The value of the threshold is the same as that used in the CABAC encoder that generated the compressed bit stream. If the bin count is greater than the threshold 1208, then high throughput mode is enabled 1210. The bin is decoded 1212 in normal mode. That is, if the expected bin is a context bin, it is decoded in context coding mode and if the expected bin is a bypass bin, it is decoded in bypass coding mode. Debinarization is then performed 1214 (if all bins of the expected syntax element have been decoded) to recover a syntax element. Processing of bits in the slice then continues unless the end of the slice has been reached 1216.

If high throughput mode is enabled 1202, a bin is decoded 1204 from the bit stream in high throughput mode. Debinarization is then performed 1214 (if all bins of the expected syntax element have been decoded) to recover a syntax element, and processing of bits in the slice then continues unless the end of the slice has been reached 1216. In high throughput mode, all bypass bins are decoded in bypass coding mode as in normal mode. In some embodiments, all context bins are also decoded in bypass coding mode. In some embodiments, specified context bins are decoded in bypass coding mode and the other context bins are decoded in context coding mode. For example, as is explained in more detail herein, some or all of the context bins generated for encoding coefficient transforms may be decoded in bypass coding mode while other context bins are decoded in context coding mode. In such embodiments, the particular context bins to be decoded in bypass coding mode when high throughput mode is enabled are specified by the video coding standard.

Figure 13:
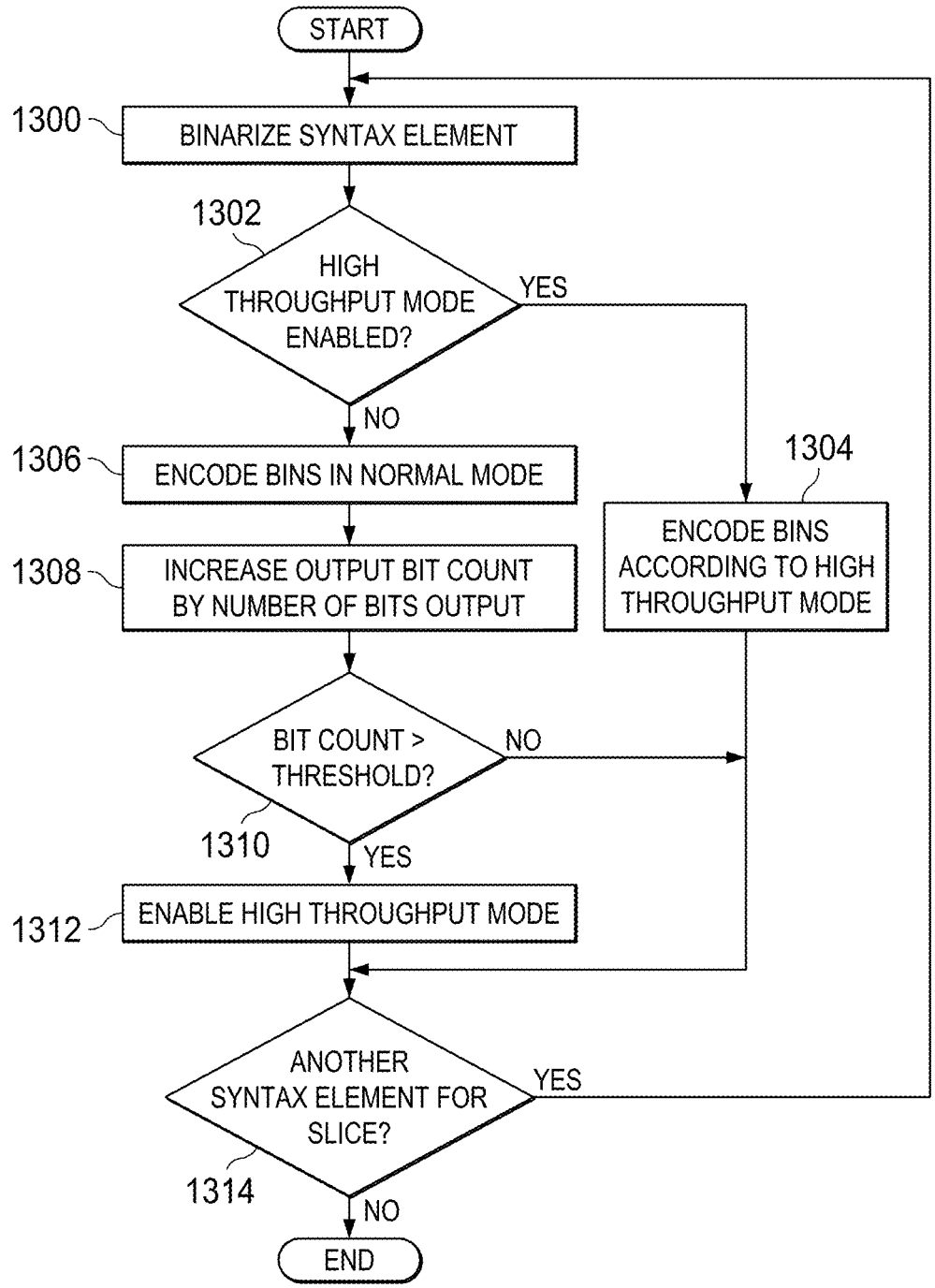

FIG. 13 is a flow diagram of a method for CABAC encoding with high throughput mode. In general, this method switches from normal CABAC mode to a high throughput mode during processing of the syntax elements of a slice based on a number of bits output in the compressed bit stream as the syntax elements are processed. The method begins at the beginning of a slice and ends at the end of the slice. If high throughput mode is enabled during the CABAC encoding of the syntax elements of the slice, it is disabled at the end of the slice. The count of bits is also reset.

Initially, a syntax element of the slice is binarized 1300 to generate the bin or bins corresponding to the syntax element. If high throughput mode is not enabled 1302, the bin or bins are encoded 1306 in normal mode. That is, if a bin is a context bin, it is context coded and if a bin is a bypass bin, it is bypass coded. A bit count is then increased 1308 by the number of bits output. The bit count is then compared 1310 to a threshold. In some embodiments, the value of the threshold, i.e., the number of bits to be output before enabling high throughput mode, is specified by the video coding standard, e.g., as a constant or as a value that specified in a particular level defined by the standard. If the bit count is greater than the threshold 1310, then high throughput mode is enabled 1312. Processing then continues with the next syntax element in the slice, if any 1314.

If high throughput mode is enabled 1302, the bin or bins are encoded 1304 in high throughput mode. Processing then continues with the next syntax element in the slice, if any 1314. In high throughput mode, all bypass bins are bypass coded as in normal mode. In some embodiments, all context bins are also bypass coded. In some embodiments, specified context bins are bypass coded and the other context bins are context coded. For example, some or all of the context bins generated for encoding coefficient transforms may be bypass coded while other context bins are context coded. In such embodiments, the particular context bins to be bypass coded when high throughput mode is enabled are specified by the video coding standard.

Figure 14:
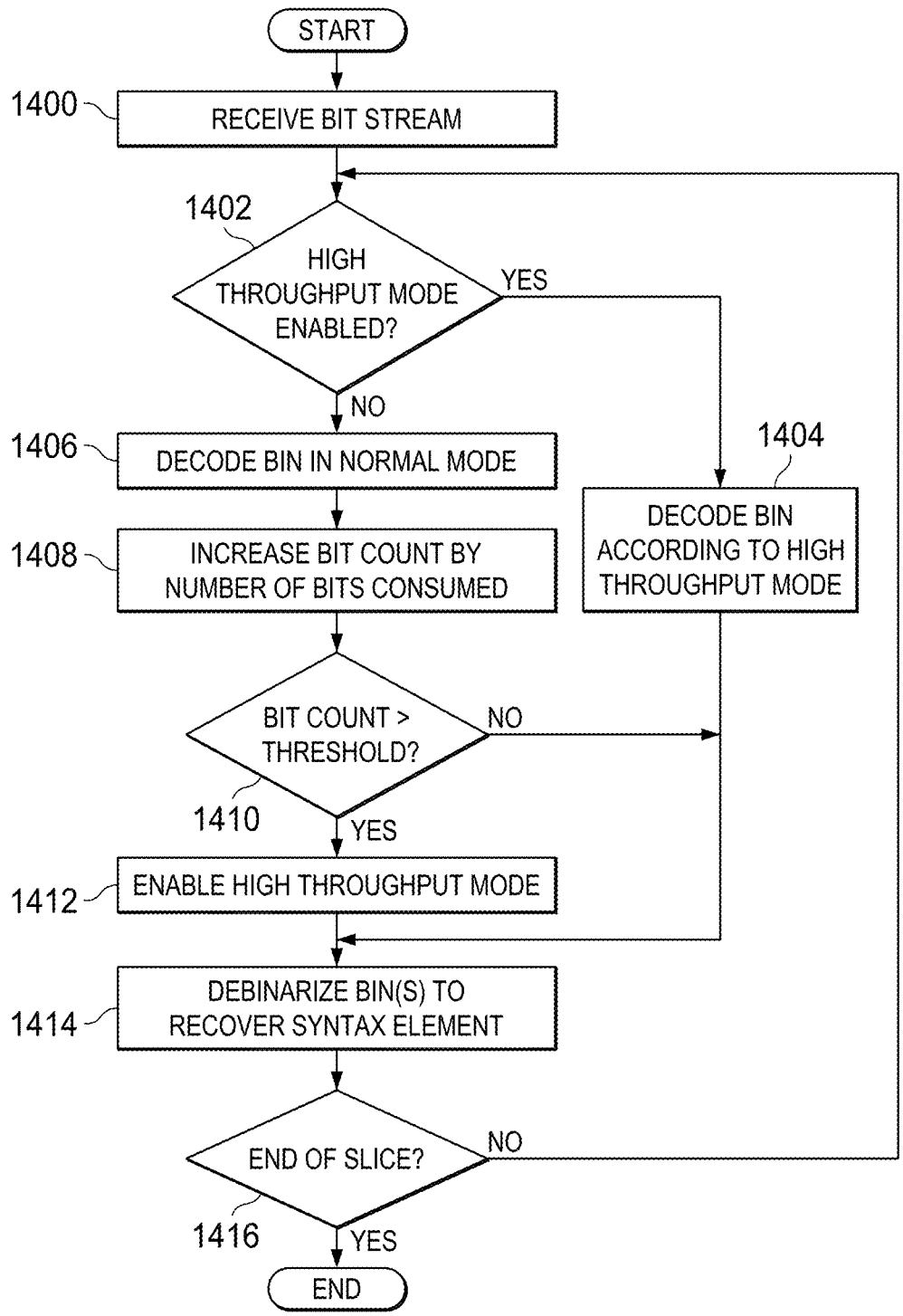

FIG. 14 is a flow diagram of a method for CABAC decoding with high throughput mode. In general, this method switches from normal CABAC mode to a high throughput mode during decoding of the syntax elements of a slice based on a number of bits consumed as the syntax elements of the slice are decoded. The method begins at the beginning of a slice and ends at the end of the slice. If high throughput mode is enabled during the CABAC decoding of the syntax elements of the slice, it is disabled at the end of the slice. The count of bits is also reset.

Initially, the compressed bit stream 1400 is received. If high throughput mode is not enabled 1402, a bin is decoded 1406 in normal mode. That is, if the expected bin is a context bin, it is decoded in context coding mode and if the expected bin is a bypass bin, it is decoded in bypass coding mode. A bit count is then increased 1408 by the number of bits of the bit stream consumed to decode the bin. The bit count is then compared 1410 to a threshold. The value of the threshold is the same as that used in the CABAC encoder that generated the compressed bit stream. If the bit count is greater than the threshold 1410, then high throughput mode is enabled 1412. Debinarization is then performed 1414 (if all bins of the expected syntax element have been decoded) to recover a syntax element. Processing of bits in the slice then continues unless the end of the slice has been reached 1416.

If high throughput mode is enabled 1402, a bin is decoded 1404 from the bit stream in high throughput mode. Debinarization is then performed 1414 (if all bins of the expected syntax element have been decoded) to recover a syntax element, and processing of bits in the slice then continues unless the end of the slice has been reached 1416. In high throughput mode, all bypass bins are decoded in bypass coding mode as in normal mode. In some embodiments, all context bins are also decoded in bypass coding mode. In some embodiments, specified context bins are decoded in bypass coding mode and the other context bins are decoded in context coding mode. For example, some or all of the context bins generated for encoding coefficient transforms may be decoded in bypass coding mode while other context bins are decoded in context coding mode. In such embodiments, the particular context bins to be decoded in bypass coding mode when high throughput mode is enabled are specified by the video coding standard.

Figure 15:
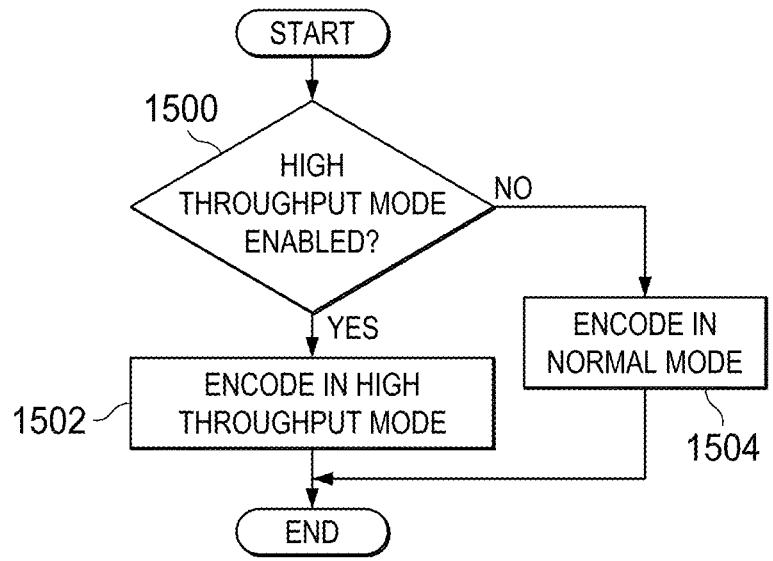

FIG. 15 is a flow diagram of a method for CABAC encoding with high throughput mode. This method assumes that high throughput mode is enabled external to the CABAC encoding, e.g., at the sequence, picture, and/or slice level. The particular levels at which high throughput mode may be enabled are defined by the video coding standard. The method of FIG. 15 may be used to process syntax elements at these particular levels. That is, if high throughput mode can be enabled at the sequence level, the method is applied to the entire sequence. If high throughput mode can be enabled at the picture level, the method is applied to each picture. If high throughput mode can be enabled at the slice level, the method is applied to each slice.

Initially, a check is made (at the beginning of the CABAC encoding of a sequence, picture, or slice) to determine if high throughput mode is enabled 1500. If high throughput mode is not enabled 1500, then the syntax elements (of the sequence, picture, or slice) are encoded 1504 in normal mode. That is, if a bin is a context bin, it is context coded and if a bin is a bypass bin, it is bypass coded.

If high throughput mode is enabled 1500, then the syntax elements (of the sequence, picture, or slice) are encoded 1502 in high throughput mode. In high throughput mode, all bypass bins are bypass coded as in normal mode. In some embodiments, all context bins are also bypass coded. In some embodiments, specified context bins are bypass coded and the other context bins are context coded. For example, some or all of the context bins generated for encoding coefficient transforms may be bypass coded while other context bins are context coded. In such embodiments, the particular context bins to be bypass coded when high throughput mode is enabled are specified by the video coding standard. Although not specifically shown, whether or not high throughput mode is enabled (for a sequence, picture, or slice) is signaled in the compressed bit stream (in the sequence parameter set, a picture parameter set, or a slice header).

Figure 16:
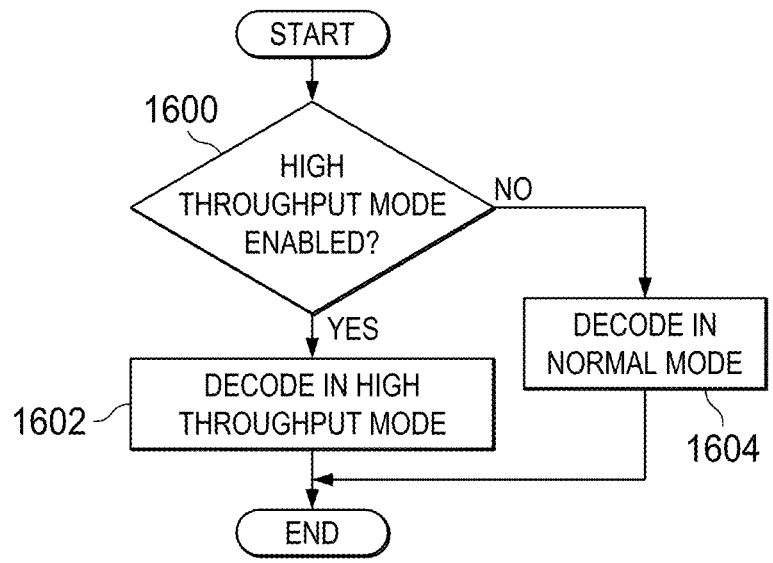

FIG. 16 is a flow diagram of a method for CABAC decoding with high throughput mode. This method assumes that a flag indicating whether or not high throughput mode is enabled at a particular level, e.g., at the sequence, picture, and/or slice level, is signaled in the compressed bit stream, e.g., in the sequence parameter set, a picture parameter set, or a slice header. The particular levels at which high throughput mode may be signaled are defined by the video coding standard. The method of FIG. 16 may be used to process syntax elements at these particular levels. That is, if high throughput mode can be enabled at the sequence level, the method is applied to the entire sequence. If high throughput mode can be enabled at the picture level, the method is applied to each picture. If high throughput mode can be enabled at the slice level, the method is applied to each slice.

Initially, a check is made (at the beginning of the CABAC decoding of a sequence, picture, or slice) to determine if high throughput mode is enabled 1600. If high throughput mode is not enabled 1600, then the syntax elements (of the sequence, picture, or slice) are decoded 1604 in normal mode. That is, if a bin is a context bin, it is decoded in context coding mode and if a bin is a bypass bin, it is decoded in bypass coding mode.

If high throughput mode is enabled 1600, then the syntax elements (of the sequence, picture, or slice) are decoded 1602 in high throughput mode. In high throughput mode, all bypass bins are decoded in bypass coding mode as in normal mode. In some embodiments, all context bins are also decoded in bypass coding mode. In some embodiments, specified context bins are decoded in bypass coding mode and the other context bins are decoded in context coding mode. For example, some or all of the context bins generated for encoding coefficient transforms may be decoded in bypass coding mode while other context bins are decoded in context coding mode. In such embodiments, the particular context bins to be decoded in bypass coding mode when high throughput mode is enabled are specified by the video coding standard.

Figure 17:
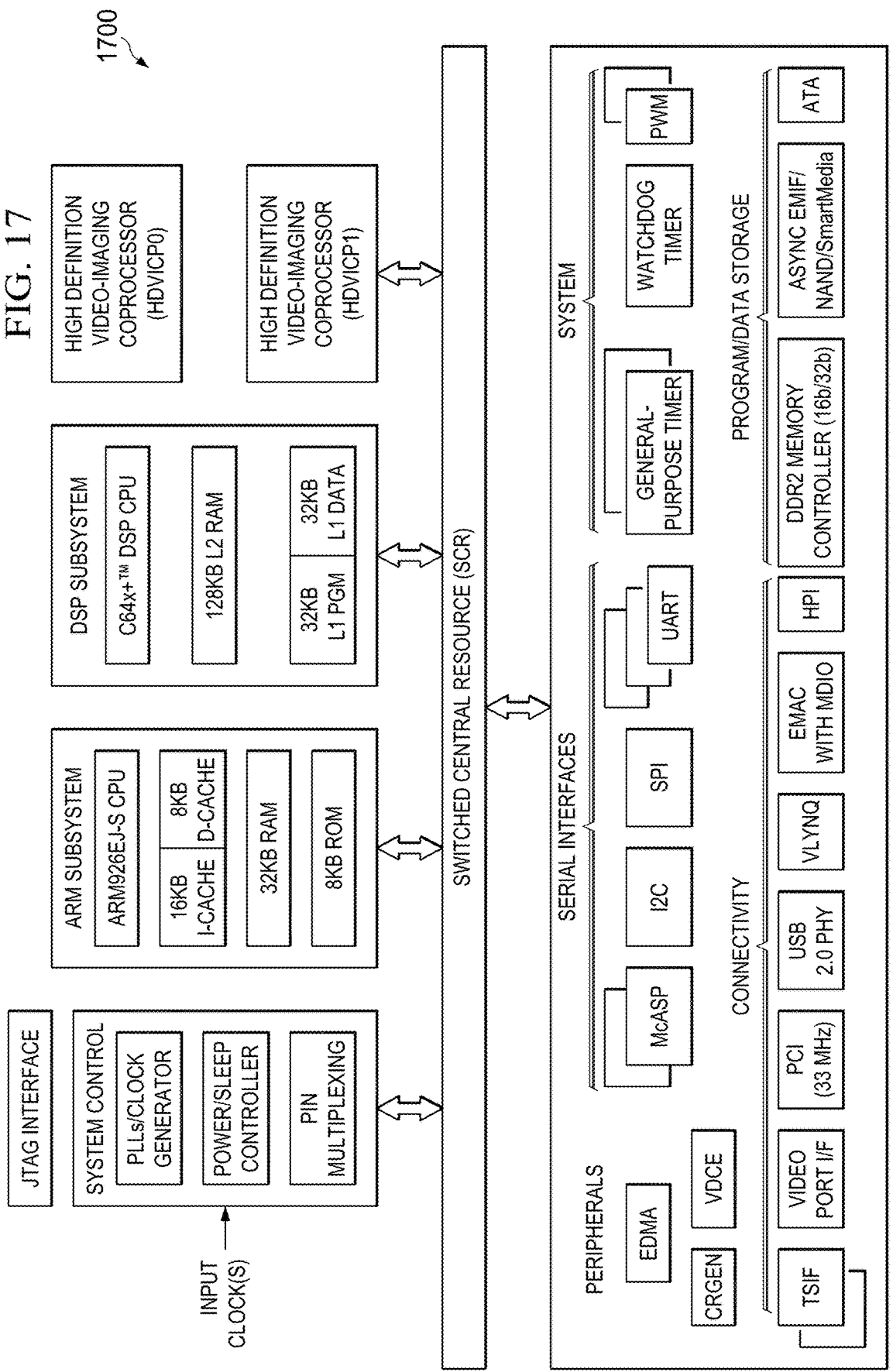
FIG. 17 is a block diagram of an illustrative digital system.

FIG. 17 is a block diagram of an example digital system suitable for use as an embedded system that may be configured to perform CABAC encoding with scalable throughput during video encoding and/or to perform CABAC decoding with scalable throughput during video decoding as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1700 is a programmable platform designed to meet the processing needs of applications such as video encode/decode/transcode/transrate, video surveillance, video conferencing, set-top box, medical imaging, media server, gaming, digital signage, etc. The SoC 1700 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1700 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1700, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1700 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 17, the SoC 1700 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, mode decision, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1700 may be configured to perform CABAC encoding with scalable throughput as described herein when encoding a video stream and CABAC decoding with scalable throughput as described herein when decoding a compressed video bit stream. For example, the coding control of the video encoder of FIG. 3 may be executed on the DSP subsystem or the ARM subsystem and at least some of the computational operations of the block processing, including intra-prediction, motion estimation, entropy encoding, and entropy decoding may be executed on the HDVICP coprocessors. Entropy encoding on the HDVICP coprocessors may implement techniques for CABAC encoding with high throughput mode as described herein. Entropy decoding on the HDVICP coprocessors may implement techniques for CABAC decoding with high throughput mode as described herein.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, one of ordinary skill in the art will understand embodiments in which the use of high throughput mode in CABAC encoding/decoding is configurable at a higher level. That is, in some embodiments, the encoder may selectively activate/deactivate the use of high throughput mode in CABAC encoding at a higher level, e.g. at the CU, LCU, slice, picture, and/or sequence level. In such embodiments, the threshold checking and switching to high throughput mode, e.g., as in the methods of FIGS. 9, 11, and 13, are performed when the use of the mode is activated by the encoder and is otherwise not performed. Further, in such embodiments, a flag is signaled in the compressed bit stream at the appropriate level to indicate whether or not high throughput mode is activated. In a corresponding decoder, the threshold checking and switching to high throughput mode, e.g., as in the methods of FIGS. 10, 12, and 14, is performed when the use of the mode is signaled in the compressed bit stream and is otherwise not performed.

In another example, one of ordinary skill in the art will understand embodiments in which criteria other than a number of coefficients, bins, or bits may be used to decide whether or not to enable high throughput mode. For example, the number of intra-coded CUs in a slice or the number of consecutive context bins may serve as criteria for enabling high throughput mode in a slice. In another example, the sum of the magnitudes of encoded/decoded coefficients may be used to decide whether or not to enable high throughput.

In another example, embodiments are described herein which a binarizer directs bins to bypass coding or context coding based on bin type. One of ordinary skill in the art will understand embodiments in which the binarizer sends all bins to both bypass coding and context coding regardless of type and a multiplexer is used to select the correct output. Similarly, embodiments are described herein in which a bin decoder directs a compressed bit stream to bypass coding or context coding based on expected bin type. One of ordinary skill in the art will understand embodiments in which a bind decoder receives the compressed bit stream in both bypass coding and context coding regardless of expected bin type and a multiplexer is used to select the correct output.

In another example, embodiments are described herein in which a value of a threshold used to determine when high throughput mode is enabled is set by the video coding standard. One of ordinary skill in the art will understand embodiments in which the value of a threshold may be variable, i.e., the value may be set for or by an encoder based on a trade-off between coding efficiency and throughput, e.g., the threshold may be set to a high value for higher coding efficiency, or may be set to a low value for a higher throughput. In such embodiments, the threshold value is signaled to the decoder.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

The invention claimed is:

1. A method comprising:
  initiating an encoding of a video sequence to produce an encoded video sequence, wherein the encoding of the video sequence includes:
    maintaining a count of bins in a sub-block;
    context encoding a first portion of a plurality of bins, wherein the plurality of bins represent values of transform coefficients in the sub-block;

bypass encoding a second portion of the plurality of bins; and switching from context encoding the first portion of the plurality of bins to bypass encoding the second portion of the plurality of bins in response to determining that the count of bins reaches a threshold value;

distributing the encoded video sequence over a communication channel; and causing a decoding of the encoded video sequence in a decoder device, wherein the causing comprises receiving the encoded video sequence by the decoder device.

2. The method of claim 1, further comprising displaying the decoded video sequence.

3. The method of claim 1, wherein the video sequence includes real-time video.

4. The method of claim 1, wherein the video sequence includes archived video.

5. The method of claim 1, wherein the video sequence includes a combination of video from a video content provider and computer-generated graphics.

6. The method of claim 1, wherein the video sequence includes a combination of real-time video and computer-generated graphics.

7. The method of claim 1, wherein distributing the encoded video sequence includes streaming the encoded video sequence over the communication channel.

8. The method of claim 1, wherein the communication channel includes a wide area network.

9. The method of claim 1,
wherein the first portion of the plurality of bins includes an absolute value greater than flag in the sub-block, and
wherein the second portion of the plurality of bins includes a remaining absolute value of a transform coefficient level in the sub-block.

10. A method comprising:
initiating an encoding of a video sequence to produce an encoded video sequence, wherein the encoding of the video sequence includes:
maintaining a count of bins in a sub-block;
context encoding a first portion of a plurality of bins, wherein the plurality of bins represent values of transform coefficients in the sub-block;
bypass encoding a second portion of the plurality of bins; and
switching from context encoding the first portion of the plurality of bins to bypass encoding the second portion of the plurality of bins in response to determining that the count of bins reaches a threshold value;
distributing the encoded video sequence over a communication channel;
receiving the encoded video sequence by a decoder device; and
causing the video sequence to be displayed.

11. The method of claim 10, wherein the video sequence includes archived video.

12. The method of claim 10, wherein the video sequence includes a combination of video from a video content provider and computer-generated graphics.

13. The method of claim 10, wherein the video sequence includes a combination of real-time video and computer-generated graphics.

14. The method of claim 10, wherein the communication channel includes a wide area network.

15. The method of claim 10,
wherein the first portion of the plurality of bins includes an absolute value greater than flag for a in the sub-block, and
wherein the second portion of the plurality of bins includes a remaining absolute value of a transform coefficient level in the sub-block.

16. A method comprising:
initiating an encoding of a video sequence to produce an encoded video sequence, wherein the encoding of the video sequence includes:
maintaining a count of bins in a sub-block;
context encoding a first portion of a plurality of bins, wherein the plurality of bins represent values of transform coefficients in the sub-block;
bypass encoding a second portion of the plurality of bins; and
switching from context encoding the first portion of the plurality of bins to bypass encoding the second portion of the plurality of bins in response to determining that the count of bins reaches a threshold value;
causing a distribution of the encoded video sequence over a communication channel; and
receiving the encoded video sequence by a decoder device.

17. The method of claim 16, wherein the video sequence includes a combination of video from a video content provider and computer-generated graphics.

18. The method of claim 16, wherein the video sequence includes a combination of real-time video and computer-generated graphics.

19. The method of claim 16,
wherein the first portion of the plurality of bins includes an absolute value greater than flag in the sub-block, and
wherein the second portion of the plurality of bins includes a remaining absolute value of a transform coefficient level in the sub-block.

20. The method of claim 19, wherein the second portion of the plurality of bins includes a sign value of a transform coefficient level in the sub-block.

* * * * *